(12) United States Patent
Behbahani-Pour

(10) Patent No.: US 10,858,118 B2
(45) Date of Patent: Dec. 8, 2020

(54) SYSTEM, APPARATUS, AND METHOD OF PREVENTING FUEL TANK EXPLOSION

(71) Applicant: Mohammed Javad Behbahani-Pour, Safat (KW)

(72) Inventor: Mohammed Javad Behbahani-Pour, Safat (KW)

( * ) Notice: Subject to any disclaimer, the term of this patent is extended or adjusted under 35 U.S.C. 154(b) by 1017 days.

(21) Appl. No.: 15/086,284

(22) Filed: Mar. 31, 2016

(65) Prior Publication Data

US 2017/0283083 A1 Oct. 5, 2017

(51) Int. Cl.
| | |
|---|---|
| *B64D 37/32* | (2006.01) |
| *B64D 25/00* | (2006.01) |
| *A62C 99/00* | (2010.01) |
| *A62C 3/06* | (2006.01) |
| *A62C 3/08* | (2006.01) |

(52) U.S. Cl.
CPC .............. *B64D 37/32* (2013.01); *A62C 3/065* (2013.01); *A62C 3/08* (2013.01); *A62C 99/0018* (2013.01); *B64D 25/00* (2013.01)

(58) Field of Classification Search
CPC .. A62C 2/04; A62C 3/065; A62C 3/08; A62C 99/0018; B64D 25/00; B64D 37/10; B64D 37/32
See application file for complete search history.

(56) References Cited

U.S. PATENT DOCUMENTS

| | | | | | |
|---|---|---|---|---|---|
| 2,889,955 | A | * | 6/1959 | Naulty | A62C 3/08 220/88.3 |
| 5,979,481 | A | * | 11/1999 | Ayresman | B60K 15/03 137/14 |
| 7,152,635 | B2 | * | 12/2006 | Moravec | B64D 37/32 141/64 |

(Continued)

FOREIGN PATENT DOCUMENTS

| | | |
|---|---|---|
| EP | 2233175 A1 | 9/2010 |
| EP | 2332836 A2 | 6/2011 |

(Continued)

OTHER PUBLICATIONS

Transmittal of the International Search Report and the Written Opinion of the International Searching Authority dated Jan. 5, 2017, in connection with corresponding International Application No. PCT/IB2016/000862, filed May 11, 2016 (15 pgs.).

(Continued)

*Primary Examiner* — Alex M Valvis
(74) *Attorney, Agent, or Firm* — Maier & Maier, PLLC

(57) ABSTRACT

According to an exemplary embodiment, an inerting and pressurization system for a fuel tank may be provided. The inerting and pressurization system may include an inert gas supply network, a number of valves and a number of air separator modules. The inerting and pressurization system may further include a programmable controller that may automatically increase the proportion of inert gas in the inert gas supply network. According to a second exemplary (Continued)

embodiment, a fire extinguishing system may include a number of air-separation modules that may supply an inert gas to a supply network and a programmable controller that may be operatively connected with the inert gas supply network to control how the inert gas outputs may be distributed in response to a fire threat signal.

6 Claims, 22 Drawing Sheets

(56) References Cited

U.S. PATENT DOCUMENTS

| | | | | |
|---|---|---|---|---|
| 7,918,358 B2* | 4/2011 | Gupta | ............. | B64D 37/32 |
| | | | | 220/88.3 |
| 8,801,831 B1* | 8/2014 | Snow, Jr. | ............. | A62C 99/0018 |
| | | | | 95/1 |
| 9,567,094 B2* | 2/2017 | Tichborne | ............. | B64D 37/32 |
| 2002/0117052 A1* | 8/2002 | Beers | ............. | B64F 1/28 |
| | | | | 95/54 |
| 2002/0139542 A1 | 10/2002 | Lessi et al. | | |
| 2005/0247197 A1* | 11/2005 | Snow, Jr. | ............. | B64D 37/32 |
| | | | | 95/138 |
| 2006/0021652 A1* | 2/2006 | Surawski | ............. | B64D 37/32 |
| | | | | 137/209 |
| 2006/0260392 A1 | 11/2006 | Hedrick | | |
| 2013/0206910 A1* | 8/2013 | Stolte | ............. | B64D 25/00 |
| | | | | 244/129.2 |
| 2015/0217153 A1* | 8/2015 | Jones | ............. | A62C 3/08 |
| | | | | 169/62 |

FOREIGN PATENT DOCUMENTS

| | | |
|---|---|---|
| EP | 2623159 A1 | 8/2013 |
| WO | 2005/115123 A2 | 12/2005 |

OTHER PUBLICATIONS

Great British Office Action dated Oct. 4, 2019, in connection with corresponding GB Application No. 1817723.8 (4 pgs).

* cited by examiner

SYSTEM, APPARATUS, AND METHOD OF PREVENTING FUEL TANK EXPLOSION

BACKGROUND

In an aircraft, any fire in the vicinity of a fuel tank may transfer heat to the fuel and start a fire or cause the explosion of the tank. It may be noted that for kerosene, and fuels commonly used in large passenger aircrafts, the auto-ignition temperature of approximately 210° C. may be quickly reached if a fire is burning in a compartment located near the fuel tank. Large transport aircrafts may have fuel tanks located throughout the aircraft, in the wings, in the cargo compartment, below the main cabin, at the aft, and in the horizontal stabilizers. Considering that a number of locations prone to fires may commonly be situated in close vicinity of the fuel tanks, it is essential to rapidly and efficiently suppress fire in any of these locations throughout the aircraft.

SUMMARY

According to an exemplary embodiment, an inerting and pressurization system for a fuel tank may be provided. The inerting and pressurization system may include an inert gas supply network and a number of valves connected to the inert gas supply network that may comprise a number of air separator modules. The inerting and pressurization system may further comprise a programmable controller that may automatically operate the number of air separator modules and the number of valves in order to increase the proportion of inert gas in the inert gas supply network. Further, the programmable controller may also monitor an at least one pressure sensor to determine the pressure of gas inside of the fuel tank.

According to a second exemplary embodiment, a fire extinguishing system may be provided. The fire extinguishing system may include a number of air-separation modules that may supply a network that may be connected with the number of air-separation modules to distribute an inert gas output. A programmable controller that may be operatively connected with the inert gas supply network and may control how the inert gas output may be distributed in response to a fire threat signal.

According to a further exemplary embodiment, a method of extinguishing fire in an aircraft compartment may be provided. The method of extinguishing fire in an aircraft compartment may be used with a fire extinguishing system and may involve the steps of sealing a volume, to which an inert gas output may be directed so as to extinguishing the fire. The inert gas may be nitrogen and may be produced by a plurality of air separator modules. A programmable controller may be operable to distribute the inert gas to the location of the fire.

BRIEF DESCRIPTION OF THE DRAWINGS

Advantages of embodiments of the present invention will be apparent from the following detailed description of the exemplary embodiments. The following detailed description should be considered in conjunction with the accompanying figures in which.

DETAILED DESCRIPTION

Figure 1:
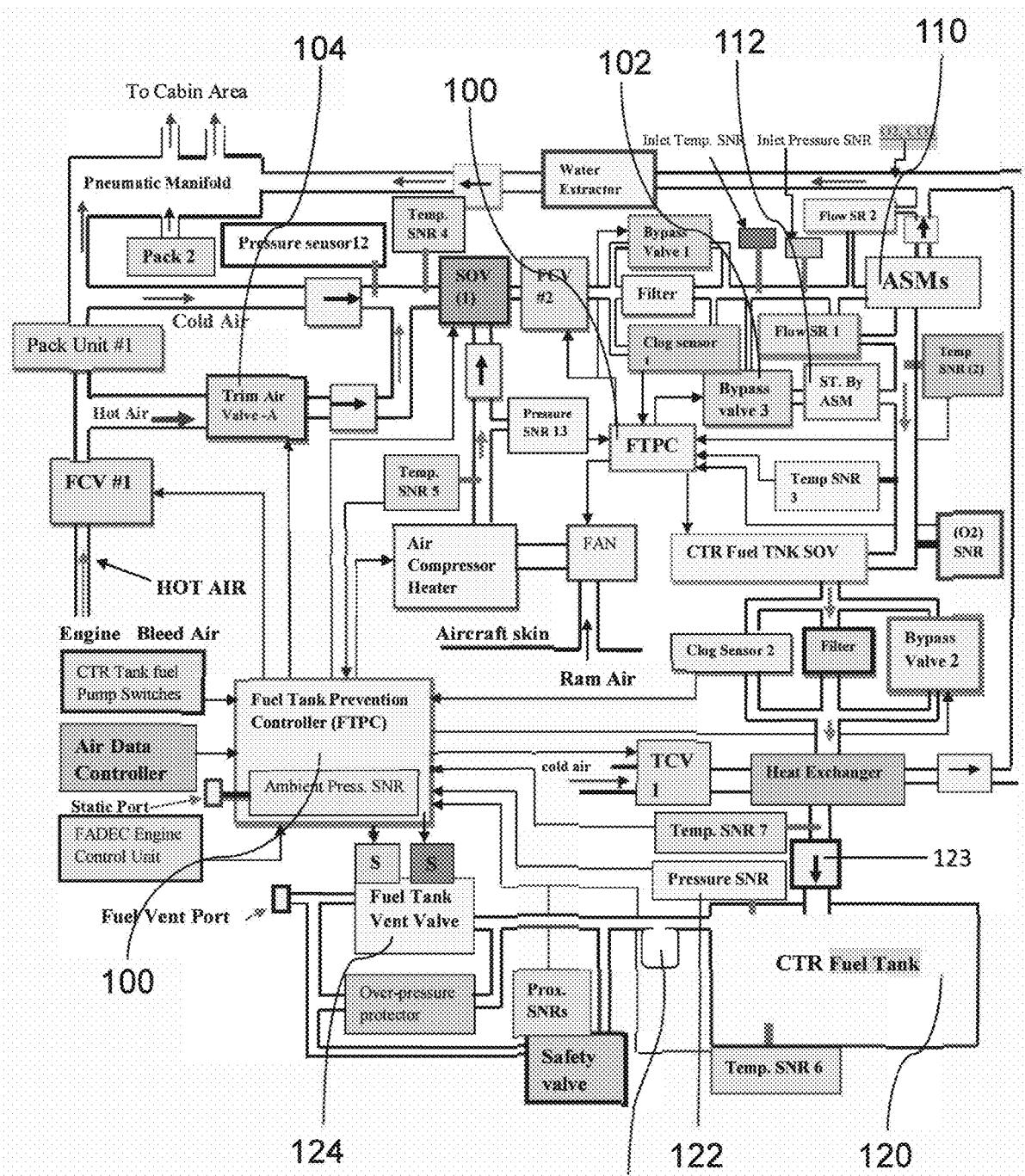
FIG. 1 may be a diagram showing an exemplary embodiment of a fuel tank pressurization system.

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Further, many of the embodiments described herein may be described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, "a computer configured to" perform the described action.

The invention may generally relate to a system, apparatus, and method to generate nitrogen from atmospheric air and direct the generated nitrogen to a number of locations to prevent or extinguish fire. In an exemplary embodiment, the atmospheric air may be supplied from the atmosphere or from the aircraft bleed system to an air separator module (ASM 110) that may utilize hollow-fiber membrane technology to produce nitrogen or any other desired technology, as may be understood by a person having ordinary skill in the art. The ASM 110 may extract nitrogen from the supplied air and may route the nitrogen to any desired locations such as the left engine, the forward cargo compartment, and the main wheel well. In order for the nitrogen to flow to the desired locations and effectively extinguish fire, certain conditions may be fulfilled, for example, the forward cargo compartment door may be closed, and the cargo compartment heating or ventilation may be isolated. It may be appreciated that any other conditions may need to be fulfilled as would be understood by a person having ordinary skill in the art.

In another exemplary embodiment, the engine bleed air losses may be minimized by installing a fuel vent valve connected to a fuel tank that may open if the maximum differential pressure between the inside and the outside of the fuel tank is reached. A value of the differential pressure may be obtained by measuring the fuel tank 120 ullage pressure and compare it with the ambient atmospheric pressure. Ullage is referred to the space above the fuel in the fuel tank. When engines are operating, the fuel booster pumps may be delivering fuel to the engines, thus creating a suction in the fuel tank 120. The suction may cause the ullage pressure to be reduced, and more nitrogen supply may be routed to the tank. This may be known as fuel tank 120 pressurization. In an exemplary embodiment, In case of any malfunction, the safety valve may operate automatically due to the differential pressure being greater than the limit, and may release overboard the excessive pressure built up in the fuel tank.

In a further exemplary embodiment, it may be appreciated that one of the most essential part of the system may be the fuel tank prevention controller (FTPC) 100. The FTPC 100 may use nitrogen generated from the ASM 110, to extinguish or avoid fire and smoke in the fuel tanks, the aircraft avionics bay, the forward, AFT and bulk Cargo compartments, the main wheel well compartments, engines, APU compartments, and lavatories. The FTPC 100 may also use nitrogen generated from the ASM 110, to detect fuel leakage from fuel tanks, and to determine which fuel tank may be leaking.

In an exemplary embodiment illustrated in FIG. 1, the airflow supply input and the airflow supply output from the air separation module (ASM 110) may be measured. If the outflow is low, blockage or malfunction of the ASM 110 may be occurring and appropriate maintenance warnings may be generated. For example, the flow may be low if the pipe line connection to the main ASM 110 is loose and the air is leaking or if the ASM 110 is blocked because of debris or foreign objects. The fuel tank prevention controller (FTPC) 100 may be a programmable controller and may command the bypass valve 3 102 to open, thus allowing bleed air to be supplied to the standby ASM 112 that may supply nitrogen to the fuel tank 120.

In another exemplary embodiment, the fuel vent ports 123 may remain closed until the maximum differential pressure limit is reached. The nitrogen flow to the fuel tank 120 may be controlled automatically and, if the desired fuel tank 120 pressurization if achieved, the supply of inert gas to the fuel tank 120 may stop and the fuel tank 120 ports may close. When the engines are operating, fuel may be burned and the ullage inside the fuel tank 120 may increase. This may lead to the pressure of the inert gas to be reduced gradually. The pressure reduction may be detected by a fuel air pressure sensors 122 that may signal the FTPC 100 to activate the supply of inert gas to the fuel tank 120. The fuel vent port 123 may open slightly and the supply of inert gas may stop when the differential pressure reaches specified limit.

Figure 2:
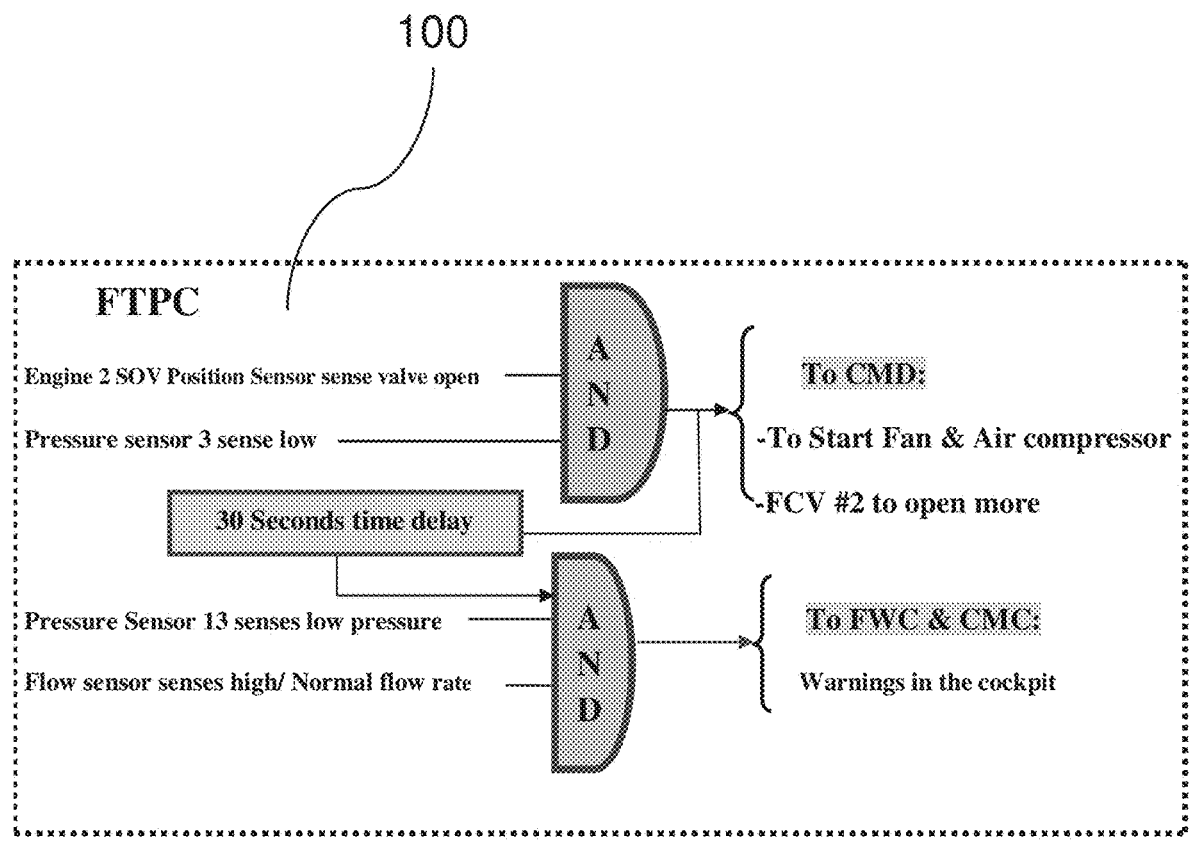
FIG. 2 may be a diagram showing an exemplary embodiment of the FTPC logic control and nitrogen leakage detection in pipe line.
Figure 3:
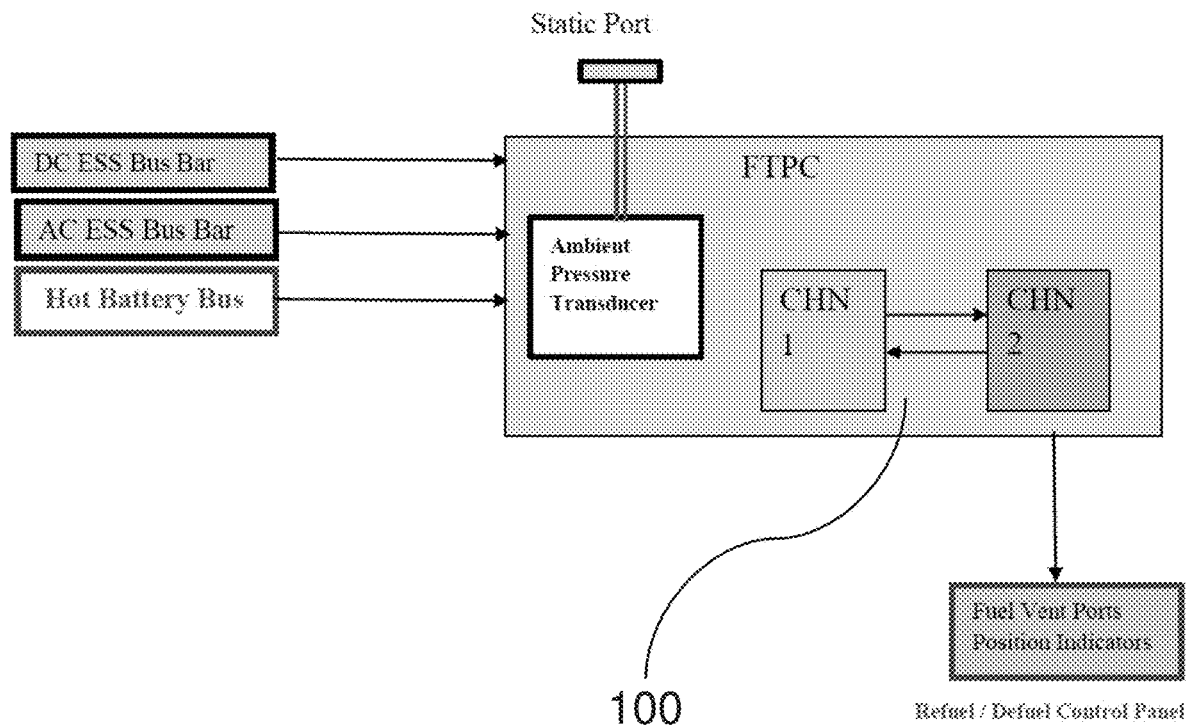
FIG. 3 may be a diagram showing an exemplary embodiment of the FTPC power supply inputs.

In an exemplary embodiment illustrated in FIG. 1-3, the pressurization of the fuel tank 120 may start as soon as the engine may start rotating. The FTPC 100 may command the shut-off valve (SOV) 1 to open and the fuel tank vent valve port to close. The bleed air from the engine may be routed to the trim air valve 104, which may control the amount of hot air. Further, a hot bleed air supply from the engine may be routed to the flow control valve (FCV 1). The air pressure may be regulated to a required value, and may be supplied to the pack unit. The pack unit may include an air cycle machine, a number of heat exchangers, and a number of control valves that may deliver cold air at selected temperature to the pneumatic manifold. The hot air from the trim air valve (TAV-A) 104 may mix with the cool air, so as to control and maintain the temperature of the air supplied to the ASM 110. The shut-off valve (SOV 1) may allow the air bleed to supply the ASM 110 and the flow control valve (FCV) 2 may regulate the pressure and air flow rate to the ASM 110. When the engine is operating but the engine bleed valve is closed or has failed in the closed position, or if there is no engine bleed air supply for any reason, whether the engine or APU is not operating, the pressure sensor 12 may sense no air pressure, and the flow sensor 1 may sense a no flow rate. The FTPC 100 may command the air compressor to start, which may draw air from the atmosphere and may pressurize it to the required pressure. The FTPC 100 may also have an internal electrical heater that may heat up the air to a required temperature, as may be understood by a person having ordinary skill in the art. When the fuel tank 120 is pressurized to the required pressure, without exceeding the differential pressure limits, then the shut-off valve (SOV 1) and the center fuel tank SOV, may close to stop the pressurization. As the fuel is burned by the engines, the air pressure inside the fuel tank 120 may decrease due to the fuel volume decrease. Further, if fuel booster pumps start operating, they may create a vacuum inside the fuel tank 120 that may cause the ullage pressure to drop. Consequently, the FTPC 100 may command the SOV (1) and the center fuel tank SOV to re-open and start pressurization again. Should the differential pressure exceed the predetermined limit, the FTPC 100 may send a signal to open the fuel tank vent valve 124 until the differential pressure is reduced back to the limit then the fuel tank vent valve 124 may close.

In an exemplary embodiment, the temperature of the nitrogen output may be set at approximately 87 degrees Celsius and may be controlled by the temperature control valve (TCV1) to be adjusted according to the fuel temperature. When the aircraft is flying at cruising altitude, the outside air temperature may reach below −55 degrees Celsius, which may cause the fuel or water present in the fuel to freeze up and form ice crystals that may block the fuel filters and reduce the engine power.

In an exemplary embodiment, illustrated in FIG. 1, if the fuel temperature is low, the inert gas (nitrogen) temperature may be increased (TCV 1 may be closed) to warm up the fuel and thus may prevent the fuel to freeze up. There may also be occurrences where the fuel temperature may be high and may be rapidly increasing therefore producing more flammable vapors in the tank which, in turn, may increase the risk of a fuel tank explosion because fuel at a higher temperature may require less energy to ignite. Sources of ignition may be electrical arcing between electrical components located inside fuel tanks such as valves or fuel probes. Mechanical arcing may also occur between rotating parts such as fuel booster pumps that may be located inside fuel tanks. The temperature of the fuel may be controlled by reducing the temperature of the inert gas (nitrogen) that may enter the fuel tank 120. The temperature control valve (TCV 1) may keep the fuel temperature within the predetermined safe limits.

In an exemplary embodiment illustrated in FIG. 1, the flow control valve 2 may regulate the pressure of nitrogen according to the fuel tank 120 air pressure to achieve the desired pressurization. The nitrogen may flow from the ASM 110 to the center fuel tank SOV valve and from the check valve to the center fuel tank 120. The filter may collect any debris in the bleed air supply before it enters the ASM 110. If the filter is blocked, the clog sensor (a differential pressure sensor, for example) may sense the difference between the inlet pressure and the outlet pressure and may send a signal to the FTPC 100 that may command the bypass valve 1 to open.

In an exemplary embodiment, if the ASM 110 is blocked, the flow sensor 1 and the flow sensor 2 may sense a differential flow rate across the ASM 110. The output flow rate may be low from the main ASM 110 and may cause the FTPC 100 to command the bypass valve 3 to open. The bypass valve 3 may allow the air to flow from the bleed system, which may be regulated to the required temperature and pressure prior to entering the standby ASM 112. Therefore, the standby ASM 112 may act as a backup in case of ASM 110 failure. A number of one-way check valves may be installed in the fuel tank 120 so as to allow the nitrogen flow to enter the fuel tank 120, but may stop any reverse flow. The shut-off valve (SOV1) and the center fuel tank SOV may be solenoid valves (fail-safe). In case of a power supply failure or a solenoid failure, the valve may be pneumatically operated and spring-loaded to open position. In case of an electrical emergency failure, the fuel tank 120 pressurization may be not stopped. If the standby ASM 112 or main ASM 110 fails, then the applicable flow sensors may sense abnormal flow rate and may generate a warning signal.

In an exemplary embodiment illustrated in FIG. 2 a technique used to detect nitrogen flow leakage may be used to extinguish an engine fire. For example, in the event of a fire in the engine 1, as may be illustrated in FIG. 10, the FTPC 100 may command the shut of valve (SOV 1) to open to allow air supply to the ASM 110 and the SOV 3 to open to allow nitrogen from ASM 110 to flow to the nitrogen pump, which may pressurize the nitrogen in order to extinguish fire more quickly. The engine 1 SOV may open to let the nitrogen travel to the inside and the outside of the engine 1. If the pressure sensor 2 senses low pressure, the FTPC 100 may command the FCV 2 to open wider in order to increase the amount of bleed air to the ASM 110. The air compressor and fan may operate to supply more bleed air to the ASM 110. The pressure sensor 13 may sense the output pressure from the air compressor, if the pressure sensor 2 still detect a low nitrogen pressure flow to the engine 1, then after a 30 seconds time delay, the FTPC 100 may generate warning messages in the cockpit.

In another exemplary embodiment illustrated in FIG. 3, the FTPC 100 may include a number of channels. During each aircraft power up sequence, the channels may change over, in order check its circuits. If one channel fails, another one may take over and a warning message may be generated for personnel to replace the FTPC 100. The channels may receive the same data and may communicate via cross talk data-bus. The FTPC 100 may be powered from a number of aircraft DC and AC bus bars. In the event of a bus failure or a power loss, the second bus bar may power up the FTPC 100. On the refuel/defuel panel, the position of the center fuel tank vent port (open or closed) may be indicated by an annunciator for personnel. If the fuel vent valve is caught in the closed position, it may be moved manually to the open position, so the safety valve may be operated mechanically to vent the fuel tank 120. The FTPC may have an ambient pressure transducer, which may be connected to a static port through a pipe line, to calculate the ambient atmospheric pressure. Further, as a back-up, the FTPC 100 may receive ambient pressure data from the air data computers that may combine internal reference unit and air data computer.

Figure 4:
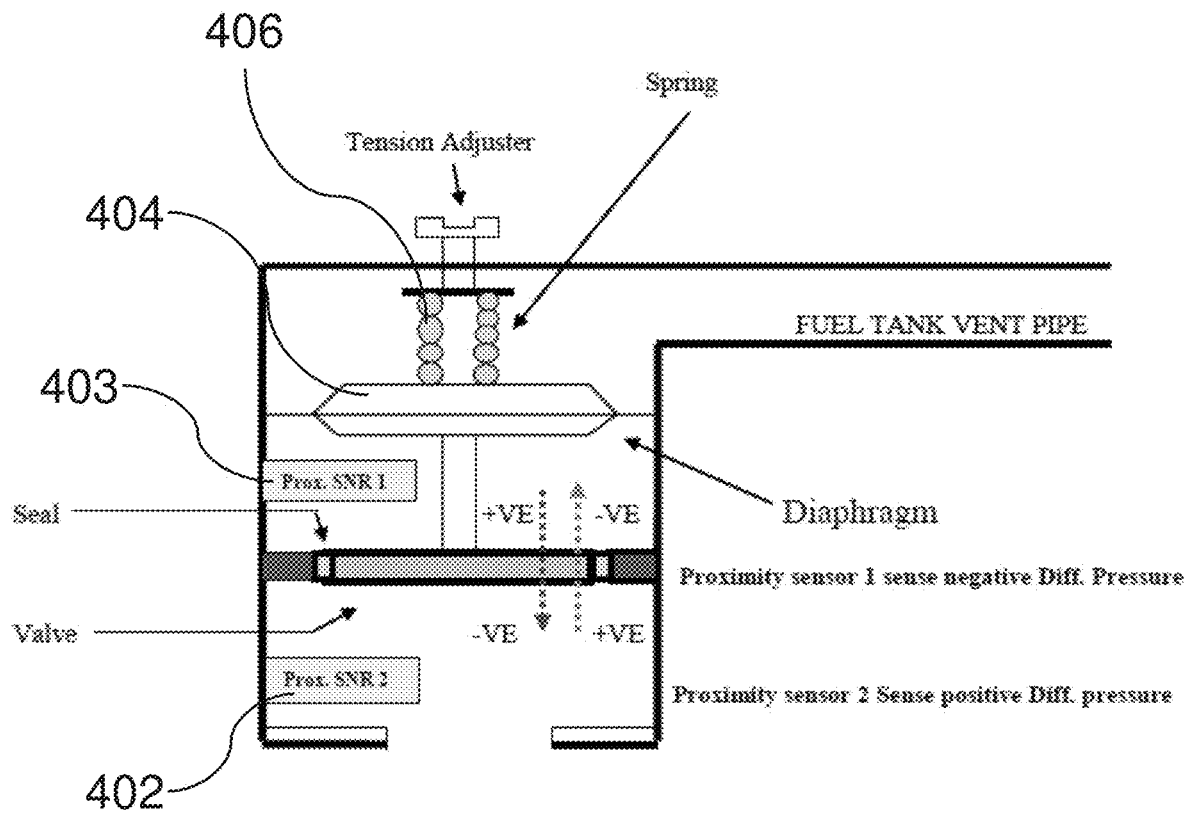
FIG. 4 may be a diagram showing an exemplary embodiment of a fuel tank safety valve.

In an exemplary embodiment illustrated in FIG. 4, if the fuel vent port fails to open, then the safety valves may operate in order to prevent a negative or positive differential pressure. The over-pressurization protector may be made of a plastic disc and may break if the maximum differential pressure is reached. The safety valve may include of a diaphragm 404 held by a tension spring 406, that may operate a valve. In case of a positive differential pressure (the pressure inside the fuel tank 120 being greater than the atmospheric pressure by a predetermined value), the valve may move down and may allow the fuel tank 120 to vent to atmosphere. The safety valve proximity sensor 2 402 may sense the proximity of the valve and may send signal to the FTPC 100 to indicate that there may be a positive maximum differential pressure. The FTPC 100 may command the SOV 1 and the center fuel tank SOV to close. In case of a negative differential pressure (atmospheric pressure greater than the fuel tank pressure), the safety valve may move upward and may allow air to enter the fuel tank 120. As the valve may move upward, the safety valve proximity sensor-1 403 may sense it, and may send a signal to the FTPC 100. The FTPC 100 may command the flow control valve (FCV #2) to open more and to increase air supply to the ASM 110 in order to supply more nitrogen to the fuel tank 120, thereby reducing the differential pressure until it may reach the predetermined limit. If the safety valve stuck in open position in case of any failure, and then if the FTPC 100 senses that there is no maximum differential pressure between ambient pressure and fuel tank ullage pressure, after a time delay of approximately 20 seconds, it can generate a failure message in the cockpit for corrective action to be taken by the aircraft maintenance personnel. The fuel tank pressurization can further be controlled by ON/OFF switch located in the cockpit, although this feature can be optional, to allow the crew to switch the entire system off for any reason.

Figure 5:
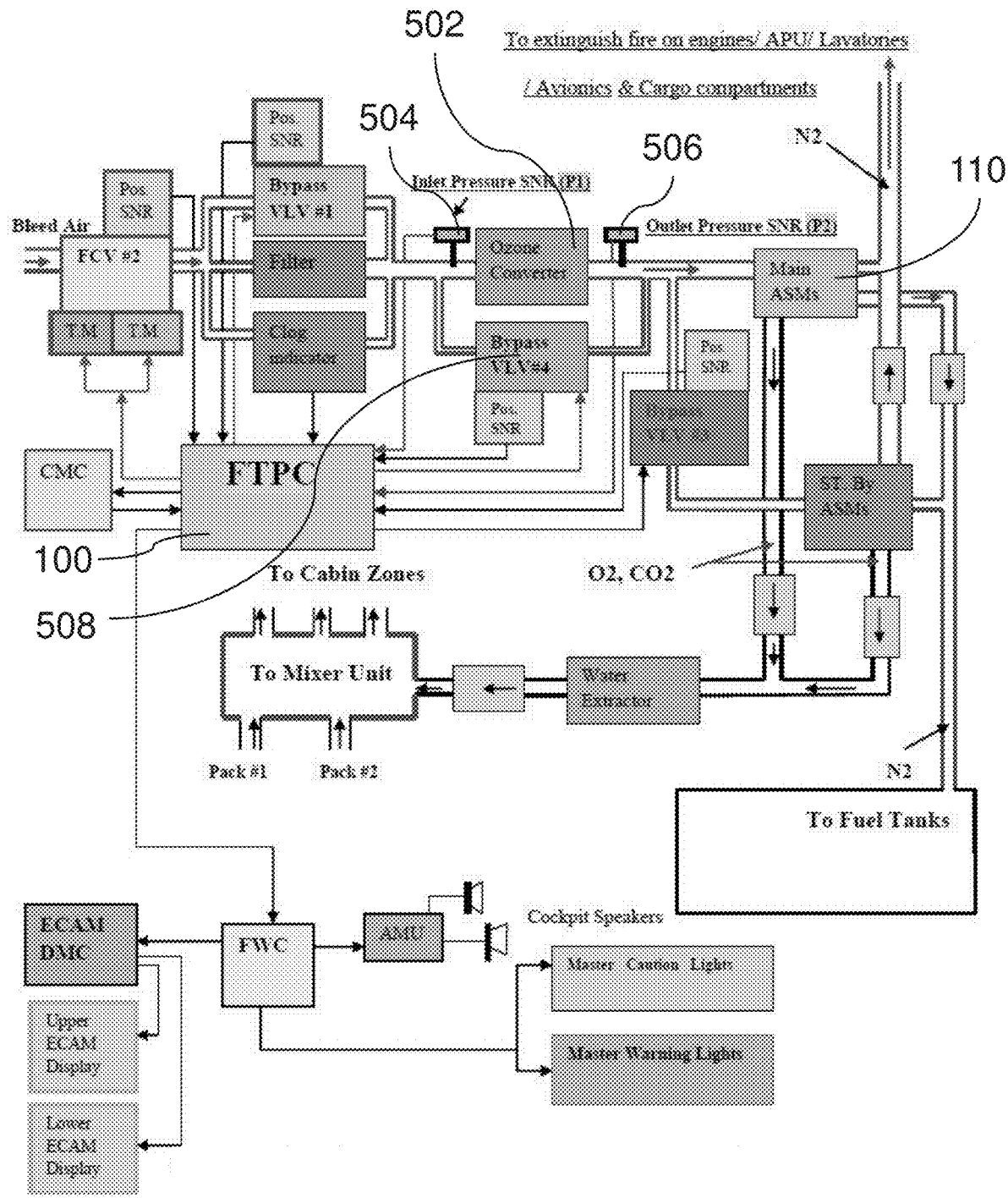
FIG. 5 may be a diagram showing an exemplary embodiment of the location of an ozone converter.

In an exemplary embodiment illustrated in FIG. 5, an ozone converter 502 may be used to convert ozone ($O_3$) into oxygen ($O_2$) by catalytic conversion. It may be appreciated that any desired ozone conversion techniques may be included, as may be understood by a person having ordinary skill in the art. The inlet pressure sensor 504 may sense the pressure of the airflow to the ozone converter and the outlet pressure sensor 506 may sense the output pressure from the ozone converter. In case of malfunction due to blockage, there may be a differential pressure greater than a predetermined limit, the FTPC 100 may open the bypass valve 4 508 and may send a signal to the flight warning computer (FWC 602) that may generate an alarm, such as an oral and text message, prompting the maintenance crew to replace the ozone converter or repair leakage at the connections. In a further embodiment, the ozone converter 502 may be installed before the airflow travels to the ASM 110 and the standby ASM 112.

Figure 6:
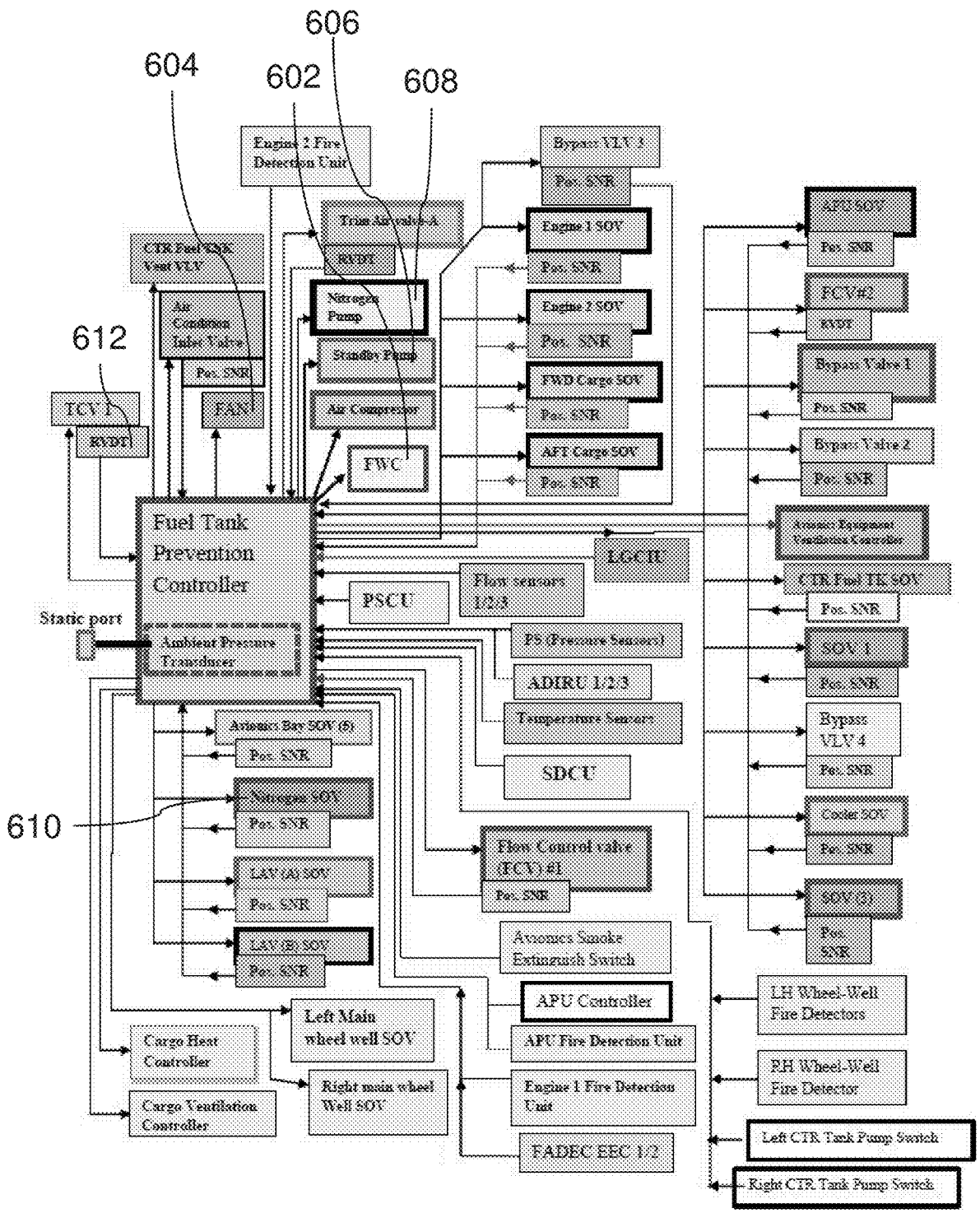
FIG. 6 may be a diagram showing an exemplary embodiment of the FTPC system interface.

FIG. 6 may illustrate an exemplary embodiment of the system interface for the FTPC 100. The system interface may include, but not be limited to the following exemplary embodiments: A flight warning computer (FWC) 602 may provide the crew with aural and visual information regarding any real time failures and, may also provide messages for the pilots to take corrective action according to procedure. The aural warnings may be broadcasted to the speakers in cockpit via the audio management unit (AMU). The visual warnings may also be given to pilots by a master warning light, a master caution lights and by messages on an electronic centralized aircraft monitor (ECAM) display. In an exemplary embodiment, the FTPC 100 may detect any failures such as shut-off valves that may be not operating or the absence of vital data such as ambient static pressure and may promptly provide warning and corrective actions to be taken for the flight crew.

Figure 10:
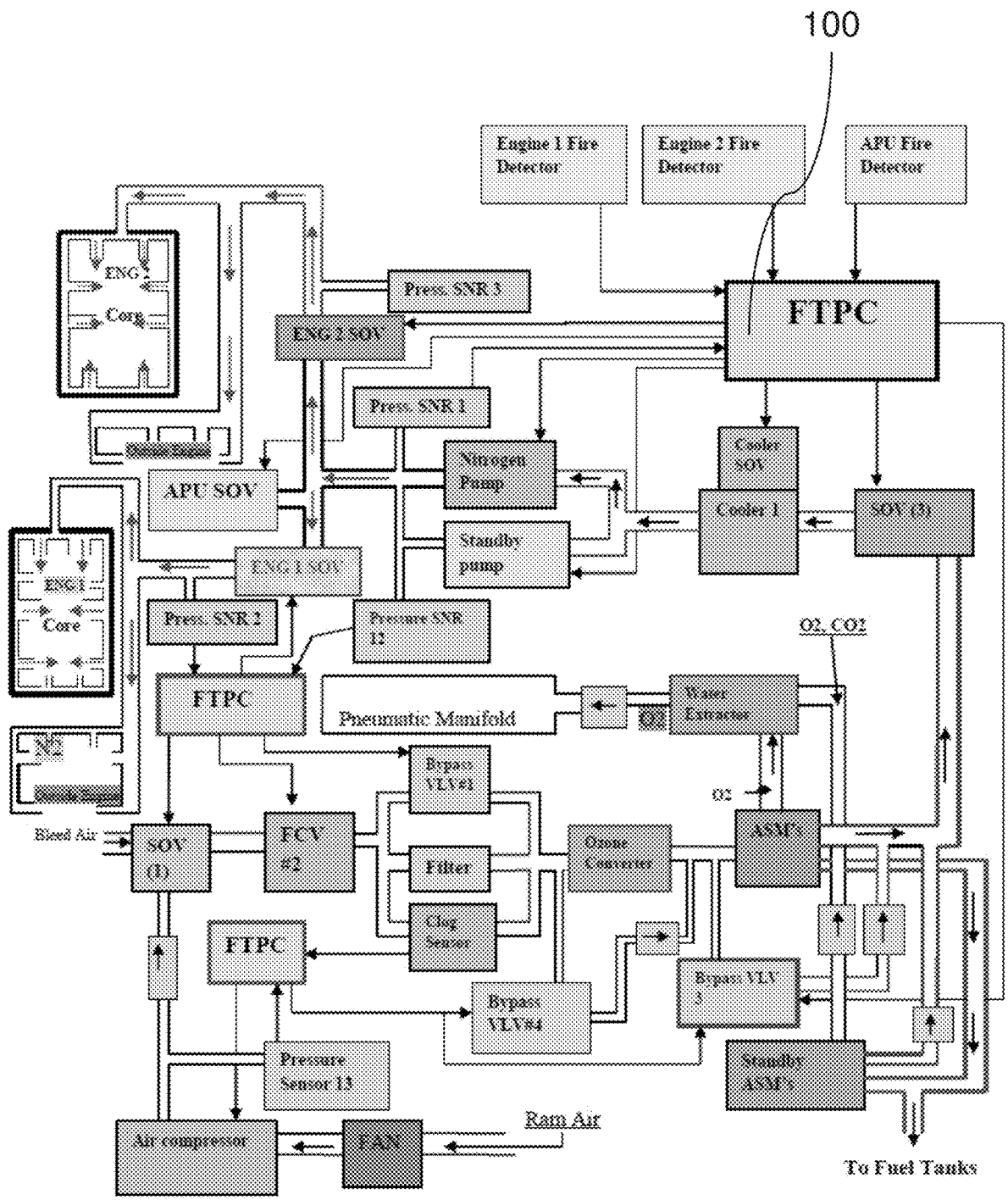
FIG. 10 may be a diagram showing an exemplary embodiment of using nitrogen to extinguish fire on the engine.

In an exemplary embodiment illustrated in FIG. 10, a fan 604 may be used to supply airflow to the ASM 110 during ground operation and when it may be required. Further, a standby pump 606 may pressurize nitrogen in case of nitrogen pump 608 failure. For example, if there is a command for the nitrogen pump 608 to start but the pressure sensor 1 senses a low pressure, the FTPC 100 may determine that the nitrogen pump 608 may be defective and may command the standby pump to run. A nitrogen shut-off valve (SOV) 610 illustrated in FIG. 8, may allow the nitrogen gas to re-circulate around the avionics equipment bay to extinguish the fire if smoke is detected. The nitrogen SOV 610 may be a dual motorized shutoff valve. If one motor fails, the other motor may take control.

In an exemplary embodiment, the trim Air Valve-A 104, (illustrated in FIG. 1) may add an adjustable quantity of hot air to the cooled air supply from the air conditioner mixer unit in order to keep the air inlet temperature to the ASM 110 from approximately 76 degrees Celsius to approximately 87 degrees Celsius to guarantee optimum performance and efficiency of the ASM 110. The valve may be operated by a dual coil torque motor (If one coil fails, the other may take control). The torque motor may changes the flowrate of the hot air that may mix with the cool air in order to achieve the target temperature from approximately 76 degrees Celsius to approximately 87 degrees Celsius. Further, a dual rotary variable differential transformer (RVDT) 612 may be used to sense the position of the torque motor position.

A flow control valve (FCV) 2 may be used to increase or decrease, the amount of air supply to the ASM 110. A high flow setting may be selected by the FTPC 100 if there is a low differential pressure between the fuel tank air pressure and the ambient static pressure. A high flow may also be selected if there is an increased demand for nitrogen supply, for example to extinguish a fire on engines, cargo compartment, lavatories, APU, avionics equipment bay and any other desired locations, as may be understood by a person having ordinary skills in the art. Further, a bypass valve 1 and a bypass valve 2, may be electrically operated. In case of filter blockage, a clog sensor 1 or a clog sensor 2, respectively, may sends a signal to the FTPC 100 which in turn may commands the bypass valve 1 to open in order to bypass the blocked filter.

If the main ASM 110 is blocked, the flow sensors 1 and the flow sensor 2 may sense low flow and a bypass valve 3 may be opened. The bypass valve 3 may regulate the airflow for the gas to achieve the required temperature and pressure before entering the standby ASM 112 and a bypass valve 4508 may be used to reroute the gas flow in case of a blockage or a malfunction of the ozone converter 502.

In an exemplary embodiment, an inlet pressure sensor may be used for the actual flow calculation and to monitor the inlet pressure of the bleed air to the ASM 110. If the inlet pressure of bleed air to the ASM 110 is low, a compressor may be operated to supply air to the ASM 110 at a predetermined pressure. An inlet temperature sensor may be used for the actual temperature calculation. Also if the inlet air supply to the ASM is not at a temperature from approximately 76 degrees Celsius to approximately 87 degrees Celsius, a signal from the inlet temperature sensor may be used by the controller to adjust the position of a trim air valve in order to achieve a desired temperature.

In an exemplary embodiment, a flow sensor 1 and flow sensor 2 may sense mass airflow. The temperature and pressure of the airflow may be required to be measured because the temperature and the pressure may have effects on the density and, consequently, on the rate of flow. The flow sensor may sense the differential pressure between the inlet and the outlet of air separator modules. There may be one flow sensor for the oxygen rich airflow and another for the nitrogen rich airflow. The air may contain 78% nitrogen, 21% oxygen and 1% other gases. If, for example, the flow rate of air to the ASM 110 is 100 lbs/min then the output from the ASM 110 may be about 78 lbs/min for the nitrogen and 22 lbs/min for the oxygen. By installing two flow sensors, a first flow sensor may measure the rate of the oxygen enriched air (OEA) and a second flow sensor may measure the nitrogen enriched air (NEA). The first sensor and the second sensor may determine if the ASM 110 are functioning correctly, are blocked, or if there may be other malfunctions such as a leakage at the union connections to the ASM 110 or any other failure as may be understood by a person having ordinary skill in the art. If the ASM 110 malfunctions, the nitrogen flow sensor may detect a lower flow and the oxygen flow sensor may detect a higher flow. In the event of a malfunction, the controller may open the bypass valve 3 to bypass the main ASM 110 and may send a signal to the FWC 602 to generate a failure message advising to replace the main ASM 110 modules. The ASM 110 may be replaced or repaired by maintenance personnel on ground. Further, a filter Clog sensor that may sense the differential pressure between the air supply inlet and the air supply outlet of the filter. When the difference of pressure becomes greater than a desired value, the switch may generate a signal indicating that the filter may be congested.

Figure 7:
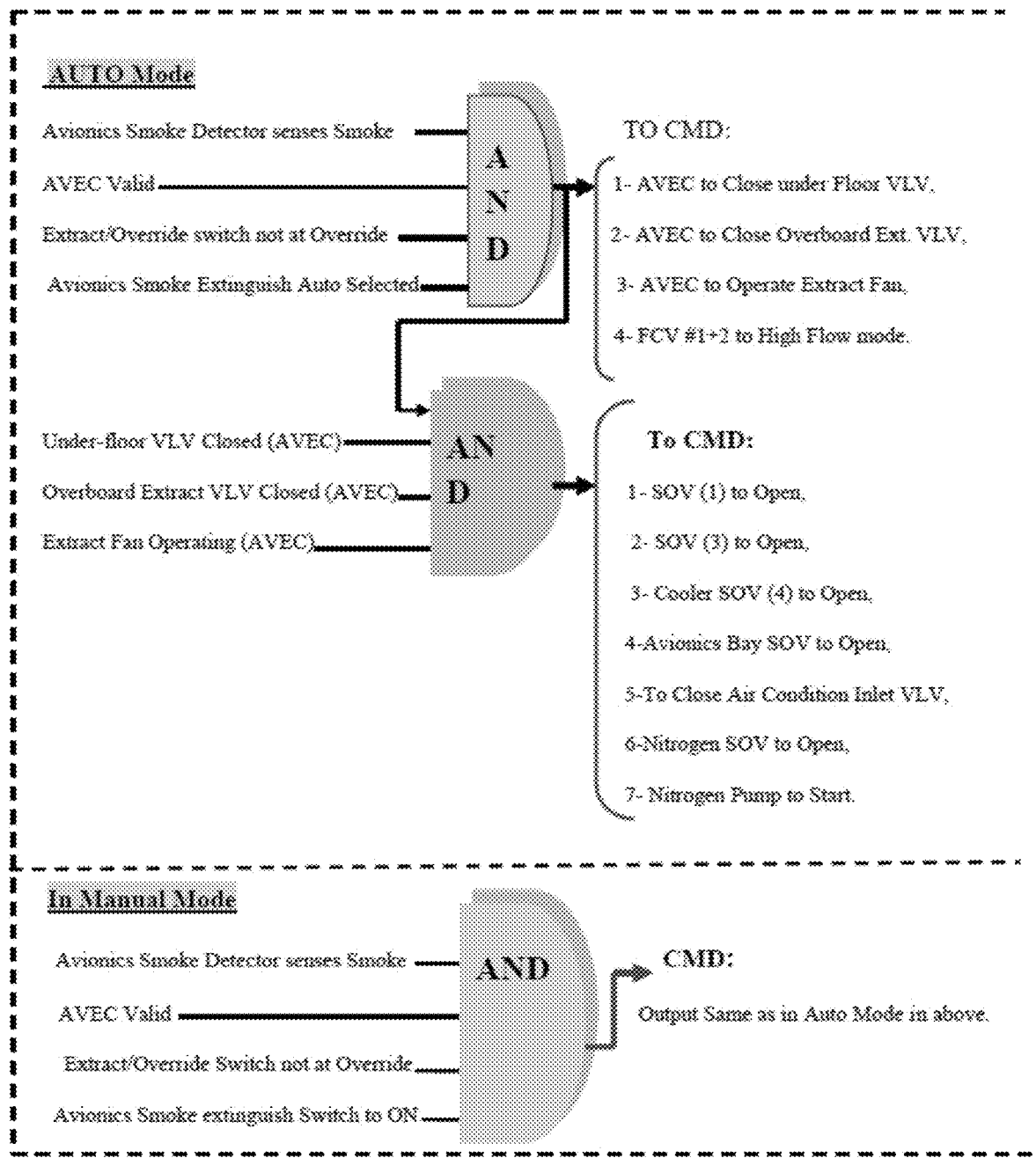
FIG. 7 may be a diagram showing an exemplary embodiment of the FTPC logics for the fire extinguishing system in the avionics equipment bay.
Figure 8:
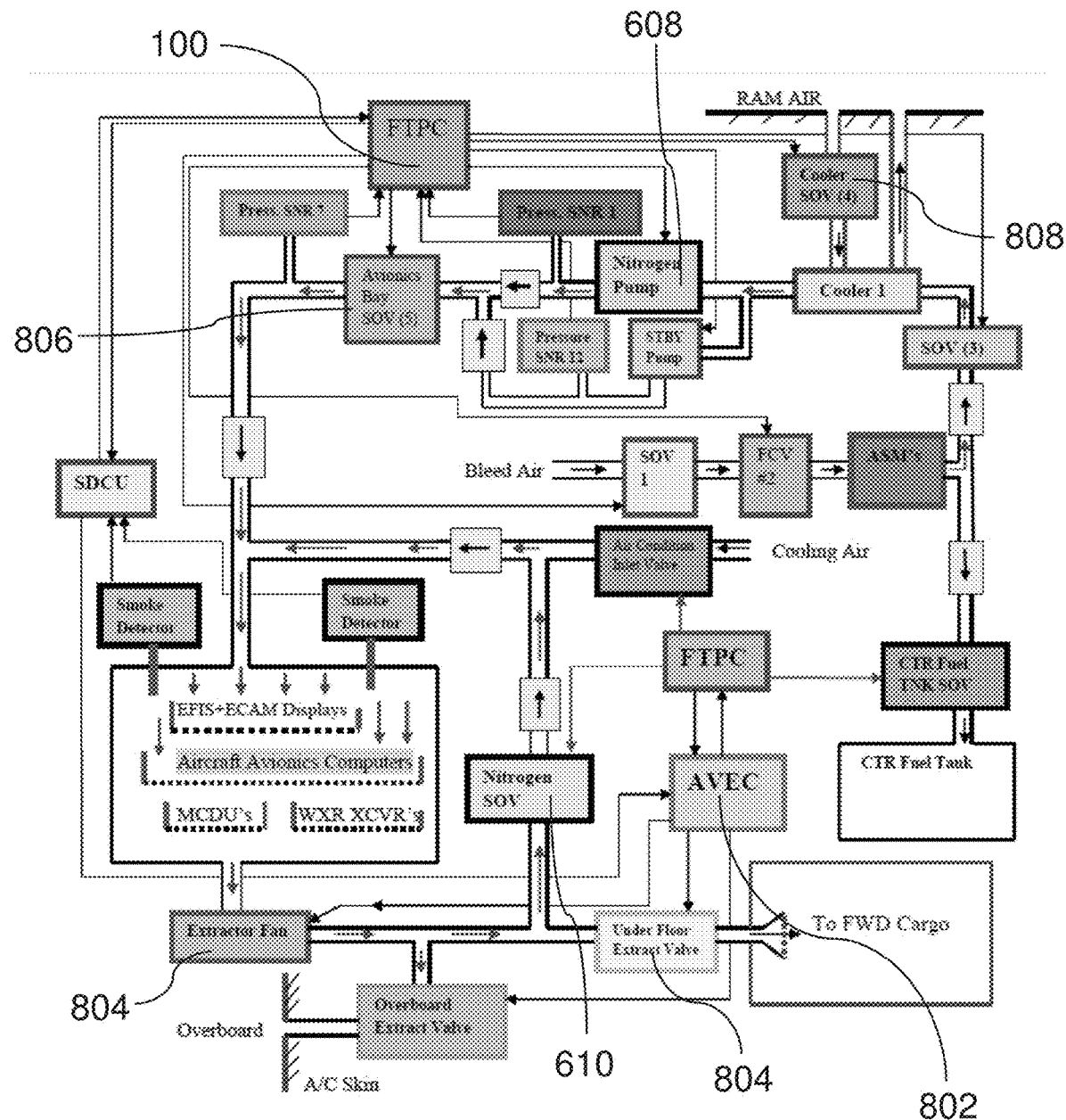
FIG. 8 may be a diagram showing an exemplary embodiment of the avionics equipment bay fire extinguishing system.

In an exemplary embodiment, an Avionics Equipment Ventilation Computer (AVEC 802) may control the avionics equipment cooling by controlling a number of under-floor extract valves, a number of overboard extract valve, a number of extractor fans, and any other desired ventilation equipment as may be illustrated in FIG. 7 and FIG. 8. The FTPC 100 may command the AVEC 802 to close at least one of the under floor extract valves, the overboard extract valves, and to start the extract fan. The supply nitrogen to a close circuit where oxygen supply to avionics equipment may be discontinued and only nitrogen may circulate in a closed loop.

In another exemplary embodiment illustrated in FIG. 1, the temperature control valve 1 (TCV 1), may have a dual torque motor, a first torque motor may be used as the main motor and the second torque motor may be used as standby. Further, the RVDT 612 may provide feedback on the position. The TCV 1 may control the temperature of the fuel in the fuel tank 120 in order to prevent auto-ignition. The FTPC 100 may measure the fuel temperature in the fuel tank 120, and may send signals to the TCV 1 to increase or decrease the amount of cold air that may be sent through the heat exchanger. Controlling the fuel temperature may reduce the amount of flammable fuel vapors in the tank and thus reduce the risk of ignition and explosion. Further, the center fuel tank SOV 4, may stop pressurizing the center tank if a positive or negative differential pressure exceeds the limits.

Figure 15:
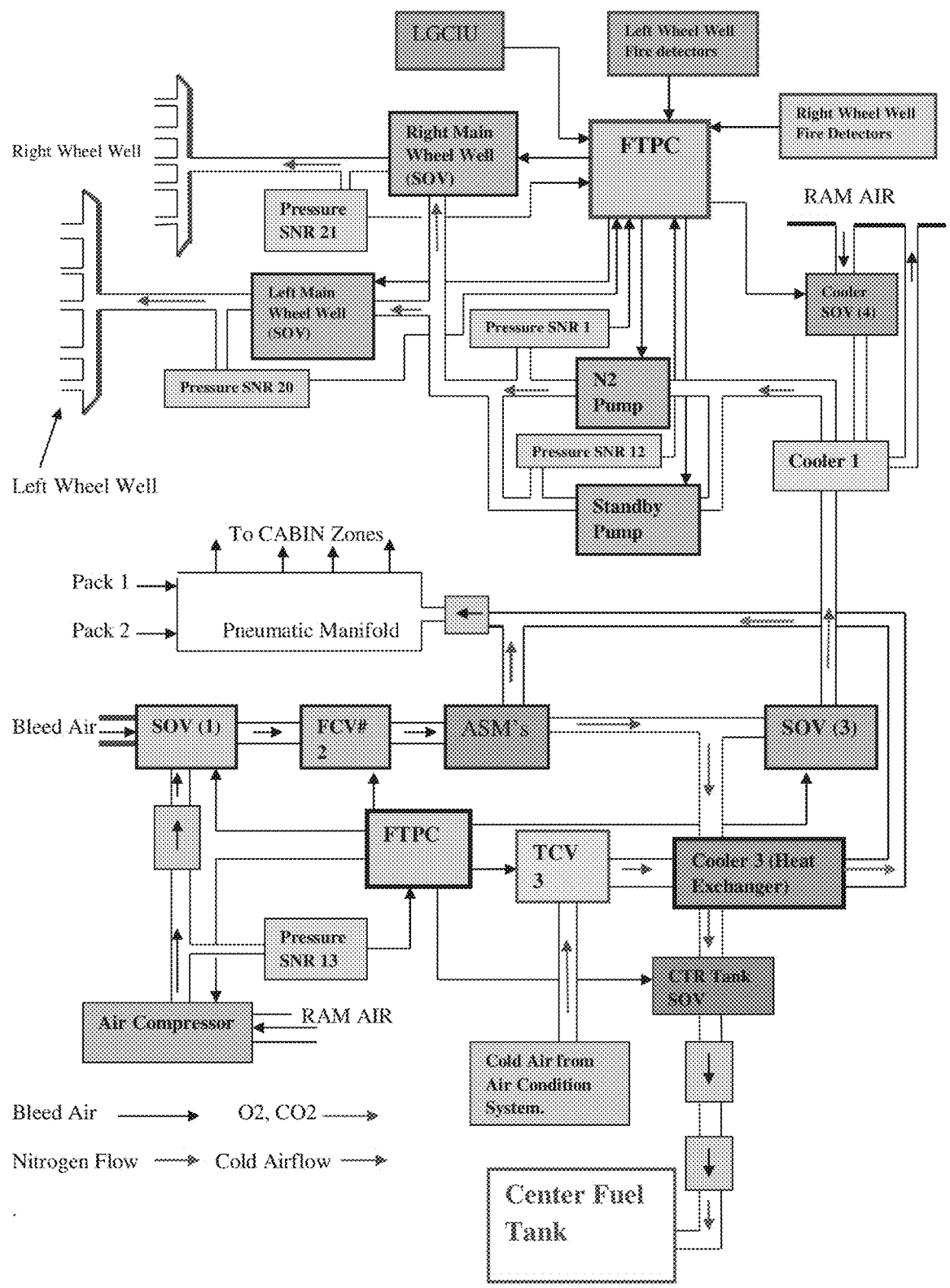
FIG. 15 may be a diagram showing an exemplary embodiment of a wheel well fire extinguishing system.

In an exemplary embodiment illustrated in FIG. 15, fuel booster pumps and fuel valves may be located in the wheel well bay. In the event of a main wheel well fire, the fire may transfer heat to the center fuel tank 120 or may ignite fuel vapors and cause explosion of the fuel tank 120. A main wheel well SOV may be used to let the nitrogen enter the main wheel well if the main landing gears are up and the wheel well's doors are closed.

In an exemplary embodiment, a cooler SOV may permit ram air to be supplied to the cooler so as to reduce the temperature of the nitrogen flow. In turn, the cooler nitrogen flow may reduce the temperature of the equipment in the avionics equipment bay. The cooler SOV may be a dual motorized shutoff valve with a first motor and a second motor. The second motor may be configured to take over if the first motor fails.

A number of volume SOV may allow the nitrogen to flow to a volume to inhibit the propagation of fire. The number of volume SOV may be dual motorized shutoff valves with a first motor and a second motor. The second motor may be configured to take over if the first motor fails. The volume may include engine, forward (FWD) cargo compartment, aft cargo compartment, avionics equipment bay, lavatories, and any desired volume in the aircraft, as may be understood by a person having ordinary skill in the art.

In an exemplary embodiment, an oxygen ($O_2$) sensor may include a ceramic element made of titanium dioxide. The electrical resistance of the sensor may change in response to the oxygen concentration. The oxygen sensor may be used to measure the oxygen concentration in the nitrogen flow output from the ASM 110. A high oxygen concentration may indicate a failure of the ASM 110 causing the FTPC 100 may generate any applicable warnings.

A pressure sensor 1 may monitor the nitrogen pump 608 output pressure. If a low pressure is sensed, the FTPC 100 may command the standby pump to start and may send a signal to the FWC 602 to generate warnings for personnel to replace the defective nitrogen pump.

In another exemplary embodiment illustrated in FIG. 2, the detailed FTPC 100 logics may include pressure transducers and may sense the nitrogen supply from the engine 1 SOV. If the FTPC 100 receives low pressure signal from the pressure sensor 2, while the engine 1 SOV is open, the FTPC 100 may command a number of fans and a number of air compressors to run in order to supply more airflow to the ASM 110. However if the flow sensors measure a normal or high flow rate from the ASM 110 while pressure sensor 2 may detect low pressure, the FTPC 100 may generate warnings for maintenance personnel to investigate. Further, pressure sensors 3 may be pressure transducers and may sense the pressure output from the engine 2 SOV. If the FTPC 100 receives a low pressure signal from the pressure sensor 3, while the engine 2 SOV is open, the FTPC 100 may command the air compressor to run in order to supply more airflow to the ASM 110. However if the flow sensors measure a normal or high flow rate from the ASM 110 but the pressure sensor 3 is still sensing a low pressure, the FTPC 100 may generate warnings for maintenance personnel to investigate. Possible causes may be either nitrogen leakage in the pipe line or the valve couplings. Similarly, the pressure sensor 4 (shown in FIG. 14) may be a pressure transducer and may sense the pressure output from the forward cargo SOV. If the FTPC 100 receives a low pressure signal from the pressure sensor 4 while the cargo compartment 2 SOV is open, the FTPC 100 may command the air compressor to run in order to supply more airflow to the ASM 110. However if a flow sensor measures a normal or high flow rate from the ASM 110 but the pressure sensor 4 is still sensing a low pressure, the FTPC 100 may generate warnings for maintenance personnel to investigate. Possible causes may be nitrogen leakage either in the pipe line or in the valve couplings. The pressure sensor 5 may sense the pressure output from the aft cargo compartment SOV. Consequently, the FTPC 100 may start the air compressor and generate warnings. The pressure sensor 7 (shown in FIG. 8) may sense the nitrogen flow pressure output from the avionics equipment bay SOV 5. The dry nitrogen generated by the ASM 110 may be used to extinguish fire or smoke in the avionics equipment bay. In an exemplary embodiment illustrated in FIG. 12, the pressure sensors 8, 9, and 10 may sense the pressure output from lavatory A, B, and C SOV's, respectively. The FTPC 100 may use the input to start the air compressor and to generate warnings for personnel to carry out maintenance operations. The pressure sensor 12 may sense the pressure output from the standby pump. If the pressure output is low, the FTPC 100 may command the air compressor to run in order to pressurize and increase the flow rate. Further, the FTPC 100 may also generate warnings. Similarly, the pressure sensor 13 may sense the pressure output from air the compressor. If the pressure is low, the FTPC 100 may generate warnings. It may be appreciated that all pressure sensors may be pressure transducers or any desired sensors, as may be understood by a person having ordinary skill in the art.

In an exemplary embodiment, a landing gear interface unit (LGIU) may supply flight or ground mode conditions for the FTPC 100 logics. Engine 1(2) master levers may be used as part of logics for the engine 1(2) fire extinguishing system. The engine 1(2) master levers may ensure that the inert gas (nitrogen) may be supplied for extinguishing fire on engines when the engine may be not operating (fuel supply stopped). Further, an engine 1(2) agent switch may be used as part of logics for the engine 1(2) fire extinguishing system. The engine 1(2) agent switch may ensure that the inert gas may be supplied to extinguish the engine fire in the event of an engine fire warning, the engine master fuel lever may be set to off, and the fire handle may be pulled and rotated.

A proximity switch control switch (PSCU) may sense the position of the forward and aft cargo compartment doors. In an exemplary embodiment, the Proximity Switch Control switch (PSCU) may be used as part of the FTPC 100 logics for the cargo compartment smoke extinguishing system. The PSCU may sense the position and status of all doors on an aircraft and may provide indication of door position status on the ECAM that may be located in the cockpit.

A number of wheel well fire detectors may be used to sense fire and overheat conditions in the number of wheel well bay. In an exemplary embodiment, pressurization may start on ground or in flight and the landing gear control interface unit (LGCIU) may provide data about status of the main landing gear and its associated doors. In the event of a fire in the wheel wells, the wheel well doors may be closed. Information about the status of the doors may be used as part of a wheel well fire extinguishing system. In a further exemplary embodiment, the fuel control management computer (FCMC) may control the fueling processes and the operation of fuel valves. Further, the fuel control management computer (FCMC) may provide data about the operation of the center tank fuel pumps. The data provided may include the status of operations and if the refueling and defueling valves are open. Further, the data may be used by the FTPC 100, as part of its logics.

In another exemplary embodiment, an air data inertial reference unit (ADIRU) may provide vital data such as aircraft speed, height, ambient atmospheric pressure, outside temperature, pitch, roll, and acceleration. It may be appreciated that any vital data may be provided by the ADIRU, as may be understood by a person having ordinary skill in the art. In order for the ADIRU to provide such data, it may have to complete an alignment mode and enter in a navigation mode which may take up to 10 minutes. Therefore, the FTPC 100 may be installed with a pressure transducer that may compute the ambient atmospheric pressure. In addition, the ADIRU may supply the FTPC 100 with ambient atmospheric pressure data, as a back-up. The FTPC 100 may use ambient atmospheric pressure data to modulate fuel tank 120 vent valve, in order to maintain the differential pressure between the fuel tank 120 and ambient air pressure within safe limit.

In an exemplary embodiment illustrated in FIG. 8, an air conditioning inlet valve may stop the air supply (and therefore, the oxygen supply) to the avionics equipment bay if smoke is detected. The air conditioning inlet valve may be a dual motorized shutoff valve with a first motor and a second motor. The second motor may be configured to take over if a first motor fails.

Further, an air compressor heater that may pressurize and heat the air supply to the ASM 110 when the bleed air supply from the engines and auxiliary power unit (APU) is not available (for example, during ground operation). Further, the air compressor heater may operate if supplementary airflow supply to ASM 110 is required, such as when one of the engine may shut down, which may affect the air supply quantity to the conditioning system (mixer unit). The compressor may be electrically driven and may supply the air at suitable pressure and flow rate.

In an exemplary embodiment, an APU fire detection unit may monitor the APU for any fire and may provide warnings to the FTPC 100 and to the cockpit. Additionally, an engine fire detection unit may monitor engines 1 and 2, and may be used by the FTPC 100 as part of fire extinguishing logics. Lavatory (A, B, and C) smoke detectors may senses smoke in lavatory (A, B, and C) and may send signal to FTPC 100 for fire extinguishing functions for lavatory (A, B, and C).

In another exemplary embodiment, a smoke detection control unit (SDCU) may sense smoke or fire in the forward craft cargo compartment of the aircraft. The FTPC 100 may require SDCU's input in order to determine which cargo compartment may be on fire.

A proximity switch control unit (PSCU) may sense the status of the forward and aft cargo compartment doors. In an exemplary embodiment, the proximity switch control unit (PSCU) may be used as part of the FTPC 100 logics for the cargo compartment smoke extinguishing system. In the event of a fire or smoke present in the forward or aft cargo compartment, the corresponding cargo compartment door may be closed to isolate the fire from the oxygen supply and to supply the nitrogen effectively to extinguish the fire. Further, the FTPC 100 may use information about the cargo compartment door position as part of its logic for the cargo compartment smoke extinguishing systems.

In an exemplary embodiment illustrated in FIG. 8, cold air from the air conditioning system may be used to cool the avionics equipment bay, then the cool air from equipment may be extracted by a number of extractor fan and may be routed to the forward cargo compartment through a number of under floor extract valve. While on the ground, the exhaust air from the equipment cooling may be released overboard via a number of overboard extract valves. If smoke is present in the avionics equipment bay, the pilot may engage an extract pushbutton causing a number of under-floor valves to close and an extract valve may open partially, so as to release the smoke overboard.

In an exemplary embodiment, the oxygen supply to the avionics equipment bay may be stopped to starve the fire from oxygen then nitrogen under pressure may be routed to all equipment to extinguish fire or smoke. Nitrogen may be generated from the ASM 110 (or the standby ASM 112), and the nitrogen temperature may be lowered by the cooler 1, which may be a heat exchanger using cold ram air from the atmosphere to cool the nitrogen. Cold nitrogen may be routed to lower the temperature of the avionics equipment bay and may reduce the risk of overheating the electronic circuit boards. Cooling nitrogen may save a number of avionics computers from damage and therefore may increase the life of the component.

In an exemplary embodiment, the avionics equipment bay smoke extinguishing system may include an automatic mode and a manual mode that may be illustrated in FIG. 7 and FIG. 8. In the automatic mode, a number of steps may be done automatically. In the event of a warning in an avionics equipment bay, the system may isolate the air supply form the equipment to stop oxygen from reaching the fire and may supply nitrogen to the equipment. In manual mode, when the pilot receives avionics equipment bay smoke warning and if there is smoke in the cockpit, the pilot may evacuate the smoke by engaging the extract pushbutton to the override position to allow the air supply to release the smoke overboard. When the smoke is cleared in the cockpit, the pilot may engage the avionics equipment bay smoke extinguish switch to the on position. The switch selector may have a number of positions, including off, auto, and on. In auto mode, when a smoke warning is generated, the avionics equipment bay smoke detector may send a signal to the FTPC 100 and, consecutively, the FTPC 100 may send a signal to the AVEC 802 to close the under floor valve and to the overboard extract valve before the extract fan may start operating. The AVEC 802 may send a position feedback data to the FTPC 100 that all relevant valves may be closed and extract fan may operate.

In an exemplary embodiment illustrated in FIG. 7, the SOV (1) may open to allow bleed air to be supplied the ASM 110, the SOV (3) may open to let the nitrogen flow through, and the cooler SOV (4) may open to let cold ram air to enter the cooler in order to reduce the temperature of the hot nitrogen, the nitrogen pump 608 may start to supply nitrogen under pressure to various points. If the nitrogen pump 608 fails, the pressure sensor 1 may detect a low pressure and the FTPC 100 may command the standby pump to run so the standby pump may be used only in emergency cases when the nitrogen pump 608 fails. As soon as the aircraft lands, the FTPC 100 may generate a warning message and maintenance personnel may replace it. A flow control valve (FCV 1 and 2) may open wider to increase the airflow to the air separate modules ASM 110 and standby ASM 112 that may have to supply nitrogen to the fuel tank 120 for pressurization as well as to the avionics equipment bay to extinguish the fire or smoke, In an exemplary embodiment illustrated in FIG. 8, the avionics equipment bay cooling may be controlled by AVEC 802 (Avionics Equipment Computer). AVEC may control all the avionics equipment cooling when on the ground and in flight. The avionics equipment fire extinguishing system may operate in two modes: auto or manual mode. In auto-mode, if smoke is detected in the avionics equipment bay, the system may automatically stop the oxygen supply to the avionics equipment bay and supply nitrogen to the avionics equipment bay cooling racks in order to extinguish the smoke or fire. Further, the FTPC 100 may send a signal to the AVEC 802 to close the under floor and overboard extract valve and to operate the extract fan 804. If the AVEC 802 confirms the closure of the under floor valve 804, the overboard valve, then the FTPC 100 may commands the number of air conditioning inlet valve to close in order to isolate the avionics equipment bay from the oxygen brought by the aircraft air conditioning system. If the position sensors confirms that the number of air conditioning inlet valves may be closed, then the avionics equipment bay SOV (5) 806 and the nitrogen SOV 610 may open. Once the AVEC 802 has closed the number of valves, only nitrogen may circulate around the avionics equipment without any bleed air supply from the air conditioning system. Nitrogen may not be ventilated overboard in order to cut the supply of oxygen to the fire and to ensure that the fire may not spread. Nitrogen is not toxic and the crew may use oxygen masks when smoke may be present in the cockpit.

In an exemplary embodiment, if the warning signaling smoke in the avionics equipment bay disappears, the nitrogen flow to the avionics equipment bay may stops. This may be done automatically when the avionics equipment bay smoke detector does no longer detect smoke for a duration of approximately 5 minutes. A signal may be sent to the FTPC 100 and the following actions may occur: the nitrogen pump 608 may stop, then the avionics equipment bay SOV (5) 806, the cooler SOV (4) 808, the nitrogen SOV 610 and the SOV (3) may close in order to stop the nitrogen flow to the avionics equipment bay. The air conditioned inlet valve may open to let air from the aircraft bleed system lower the temperature of the equipment in the avionics equipment bay. A time delay may ensure that the fire and the smoke do not re-occur. The time delay may be approximately 5 minutes or any desired duration.

In an exemplary embodiment, a manual mode may be illustrated in FIG. 7. In the manual mode, the pilot may engage the avionics equipment bay fire extinguishing switch to the on position, in order for the system to extinguish smoke or fire in avionics equipment bay. The purpose of manual mode may be to allow the pilot to evacuate the dense smoke from the cockpit, by selecting the equipment cooling override switch to override position, where the equipment cooling extract valve may open partially to exhaust the equipment cooling air and release the smoke overboard during flight (under-floor valve may close). If the pilot receives an avionics equipment bay smoke warning in the cockpit then the pilot may engage the avionics equipment bay smoke switch to the on position and, provided that the pilot has not selected extract pushbutton to override, the following actions may occur: first, the FTPC 100 may command the AVEC 802 to close the under floor valve and may ensure that the overboard extracting valve may be closed and that the extract fan may be operating. Then, the SOV (1), the SOV (3), and the cooler SOV (4) 808 may open. The nitrogen pump 608 may pressurize the nitrogen; the flow control valve (FCV 1 and FCV 2) may increase the airflow to the air separator modules to keep up with the increased demand. The air conditioning inlet valve may close to isolate the avionics equipment bay from aircraft bleed system and the nitrogen SOV 610 may open. Finally, as soon as the avionics equipment bay smoke warning may disappear, the pilot may engage the avionics equipment bay smoke extinguishing switch to the off position and all stated items may return to their normal condition.

Figure 9:
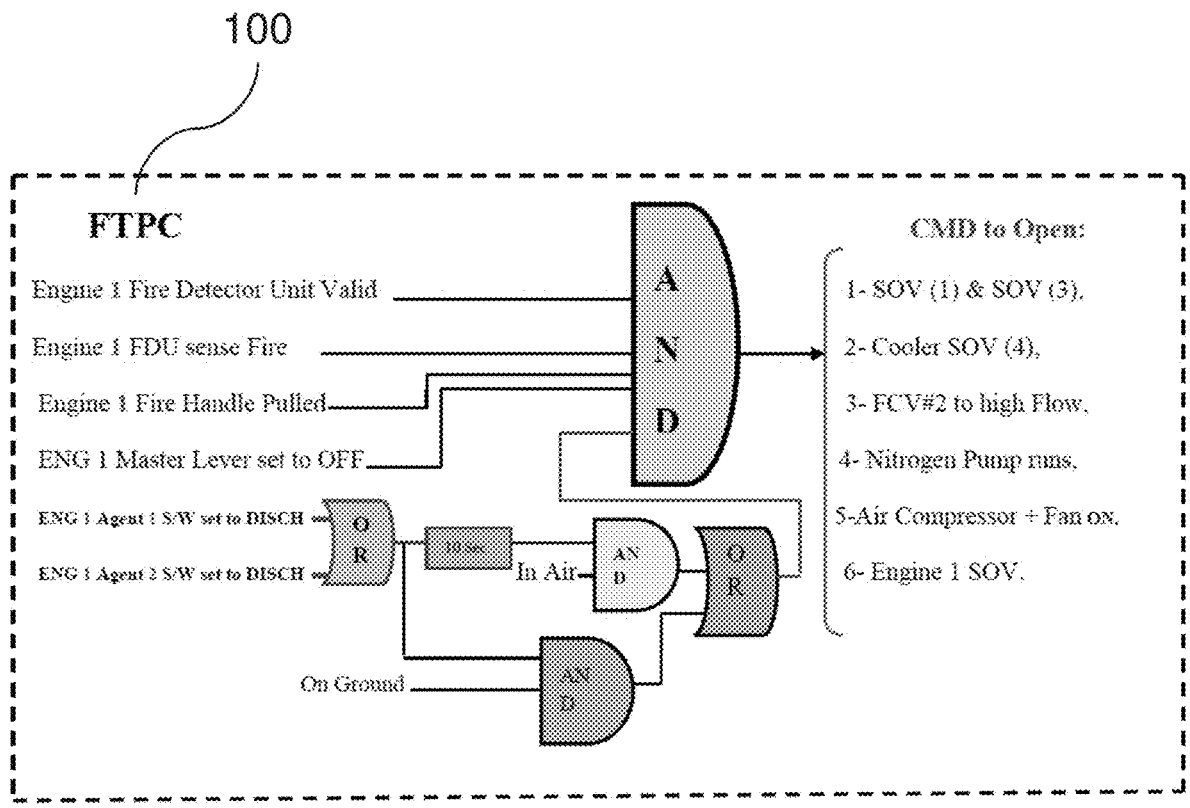
FIG. 9 may be a diagram showing an exemplary embodiment of the FTPC logics for extinguishing a fire on an engine.

In an exemplary embodiment, illustrated in FIG. 9 and FIG. 10, the engines and APU fire extinguish system may include two fire bottles, which may be used to extinguish fire on a number of engines. In case of any malfunction, such as a failure of the fire bottle, failure to release the agent, and any other malfunction as may be understood by a person having ordinary skill in the art, the safety of the plane may be compromised, and because engines may be mounted on the wings, in proximity to the fuel tank, engine fires may lead to fuel tank explosion.

In an exemplary embodiment illustrated in figure FIG. 9, if the engine 1 fire detector unit (FDU) no longer detects fire, the logic output of engine 1 FDU may be zero hence the FTPC 100 and the gate output may be zero, the associated shut-off valves may close and the pump may stop. A 10 second time delay may ensure that in case of engine fire in-flight, after the engine may have reduced its speed, the nitrogen inert gas may be supplied to the inside and the outside of the engine core to extinguish the fire.

In an exemplary embodiment illustrated in FIG. 10, the nitrogen generated by the ASM 110 may be routed to the engine on fire, and the nitrogen may be used as long as there is a fire warning or until the fire is extinguished. Further, the inert gas (nitrogen) may be used as a backup in case of failure of the primary extinguishing system. In an exemplary embodiment illustrated in FIG. 9 and in FIG. 10, in case of engine 1 fire warnings, provided the FDU 1 is serviceable, the FDU may detect the fire, the pilot may pull the engine 1 fire handle, may release the agent switch, and may set the engine 1 master lever to the off position, then the FTPC 100 may supply dry nitrogen to the inside and to the outside of the engine. If the engine fire occurs in flight, then after 10 seconds time delay, the nitrogen may be supplied to the engine 1 in order to allow the engine to windmill. If the fire occurs on the ground, there may be no time delay.

In an further exemplary embodiment, if the engine 1 is on fire, the fire detector may send a signal to the FTPC 100 to command the following actions: the SOV (1) may open to allow bleed air to ASM 110, the SOV (3) may open further to allow the nitrogen to flow to the nitrogen pump 608 inlet, the FCV 2 may open wider to increase the airflow to the ASM 110 so as to increase the nitrogen flow to affect the engine. The nitrogen pump 608 may run, in order to pressurize the nitrogen, and increase the nitrogen's ability to extinguish the fire promptly, the air compressor and fan may run as a back up to increase the airflow supply to the ASM 110. In an emergency case or in the event of a low bleed air flow rate to the ASM 110, the cooler SOV (4) may open, to allow the ram air to cool the nitrogen flow to the engine. This may reduce the temperature of the nitrogen and may increase its density, hence increasing the nitrogen extinguishing ability; the engine 1 SOV may open to allow the nitrogen to flow inside and outside of the engine 1 compartment.

In another exemplary embodiment, if the engine 2 is on fire, the fire detector may send a signal to the FTPC 100 and the SOV 1 may open to allow bleed air to the ASM 110. The SOV (3) may also open to allow nitrogen to flow to the nitrogen pump 608 inlet, the FCV 2 may open more to increase the airflow to the ASM 110 in order to generate more nitrogen flow to the affected engine. The nitrogen pump 608 may run to pressurize the nitrogen and to increase its ability to extinguish the fire promptly. The air compressor and the fan may run, as a backup, to increase airflow supply to the ASM 110. In an emergency case or in case of a low bleed air flow rate to the ASM 110, the cooler SOV (4) may open to allow the ram air to cool the nitrogen flow directed to the engine, reduce the temperature of nitrogen, increase its density, thus increasing the nitrogen extinguishing ability. Finally, the engine 2 SOV may open to allow the nitrogen to flow to the inside and the outside of the engine 2 compartment.

In an exemplary embodiment, if the APU is on fire, the APU fire detector may send a signal to the FTPC 100 and the SOV 1 may open to allow bleed air to the ASM 110, the SOV (3) may open to allow the nitrogen to flow to the nitrogen pump 608 inlet. The FCV 2 may open more to increase the airflow to the ASM 110 in order to generate more nitrogen flow to the affected engine. The nitrogen pump 608 may run, in order to pressurize the nitrogen and increase its ability to extinguish the fire promptly. The air compressor and the fan may run as a back up to increase airflow supply to the ASM 110. In an emergency case or in the event of a low bleed air flow rate to the ASM 110, the cooler SOV (4) may open, in order to allow the ram air to cool the nitrogen flow to the engine. This may reduce the temperature of the nitrogen and may increase its density, thus increasing nitrogen extinguishing ability. The APU SOV may open to allow the nitrogen to flow to the inside and the outside of the APU compartment.

Figure 11:
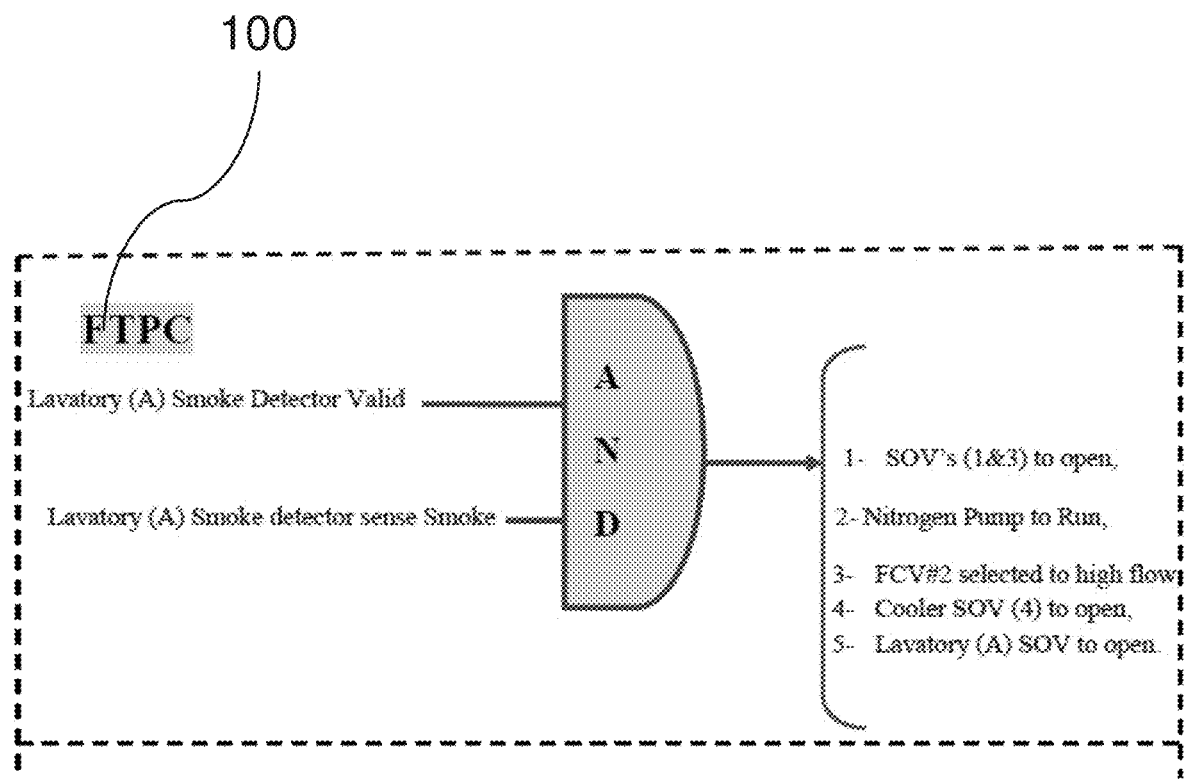
FIG. 11 may be a diagram showing an exemplary embodiment of the FTPC logics for lavatory fire and smoke extinguishing system.

Referring to FIG. 11, the FTPC 100 logics for lavatory fire and smoke extinguishing system may be illustrated. As soon as the lavatory smoke detector no longer detects either fire or smoke, the logic output of lavatory smoke detector may be zero, the associated shut-off valves may close and the pump may stop.

In another exemplary embodiment, when smoke may be detected in the lavatory, a signal may be sent to the FTPC 100. The FTPC 100 may command the nitrogen from the air separator module to flow to the specific lavatory compartment to extinguish the fire. This embodiment may be used as a backup to the main extinguishing agent for lavatory smoke and fire conditions. Now referring to FIG. 12, in the event of a smoke warning in the lavatory then the FTPC 100 may perform the following logics: the shut-off valves 1 and 3 may open, the nitrogen pump 608 may operate, the lavatory SOV may open, the cooler SOV (4) may open and the FCV 2 may increase airflow to the ASM 110 to increase the nitrogen flow rate.

Figure 13:
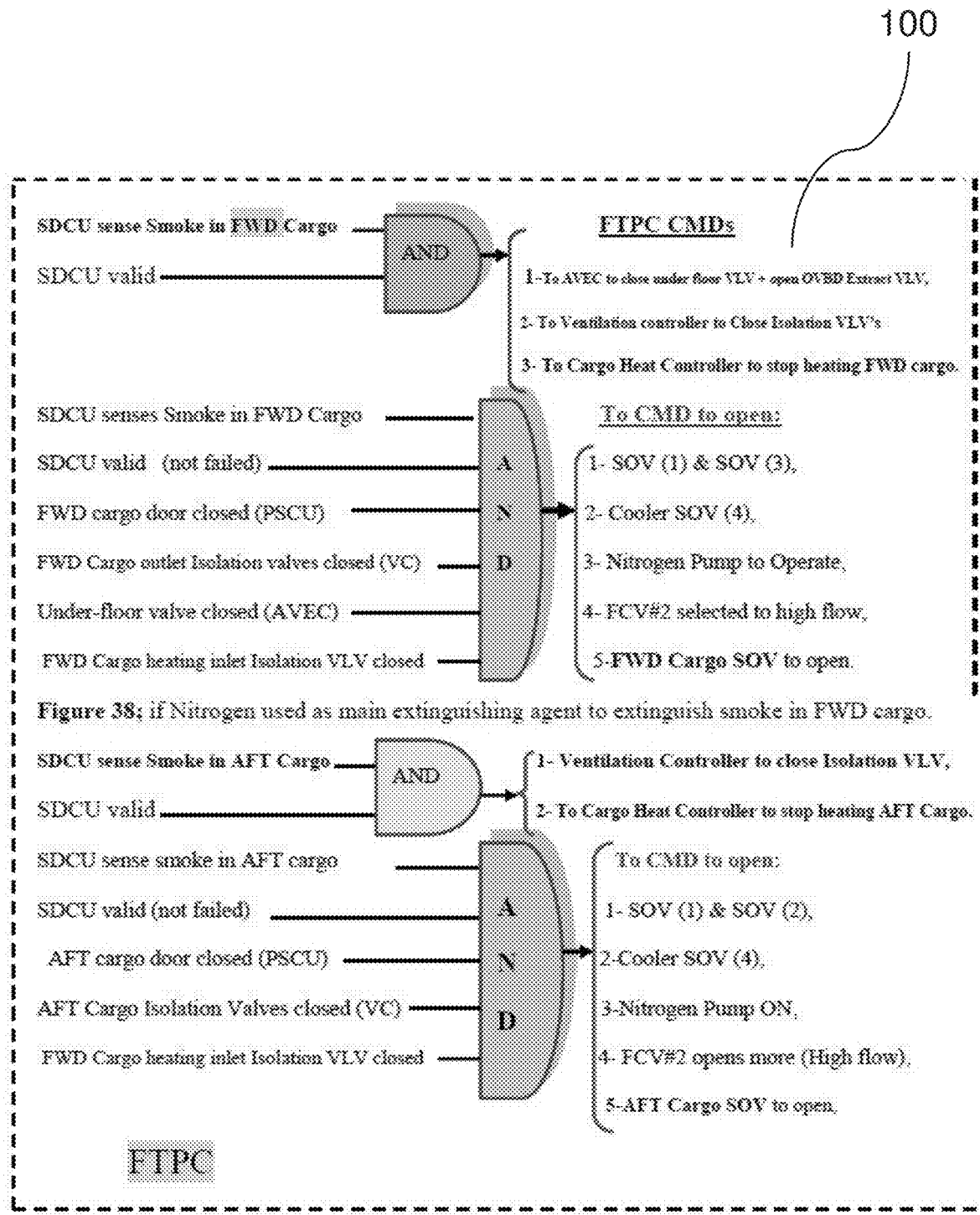
FIG. 13 may be a diagram showing an exemplary embodiment of the FTPC Logic conditions for a cargo compartment fire extinguishing system.

In an exemplary embodiment illustrated in FIG. 13, the nitrogen that may be generated from the ASM 110 may be used to extinguish fire in the forward or aft cargo compartments, provided the respective cargo compartment door may be closed. The condition may be that the nitrogen from the ASM 110 may flow to the cargo compartment if the cargo compartment door is closed and the air conditioning supply to the cargo compartment may be stopped to prevent feeding the fire with oxygen. The proximity switch control unit (PSCU) may sense the forward and aft cargo compartment doors positions by having proximity sensors that may sense the door being opened or closed and send such data to the FTPC 100.

Figure 14:
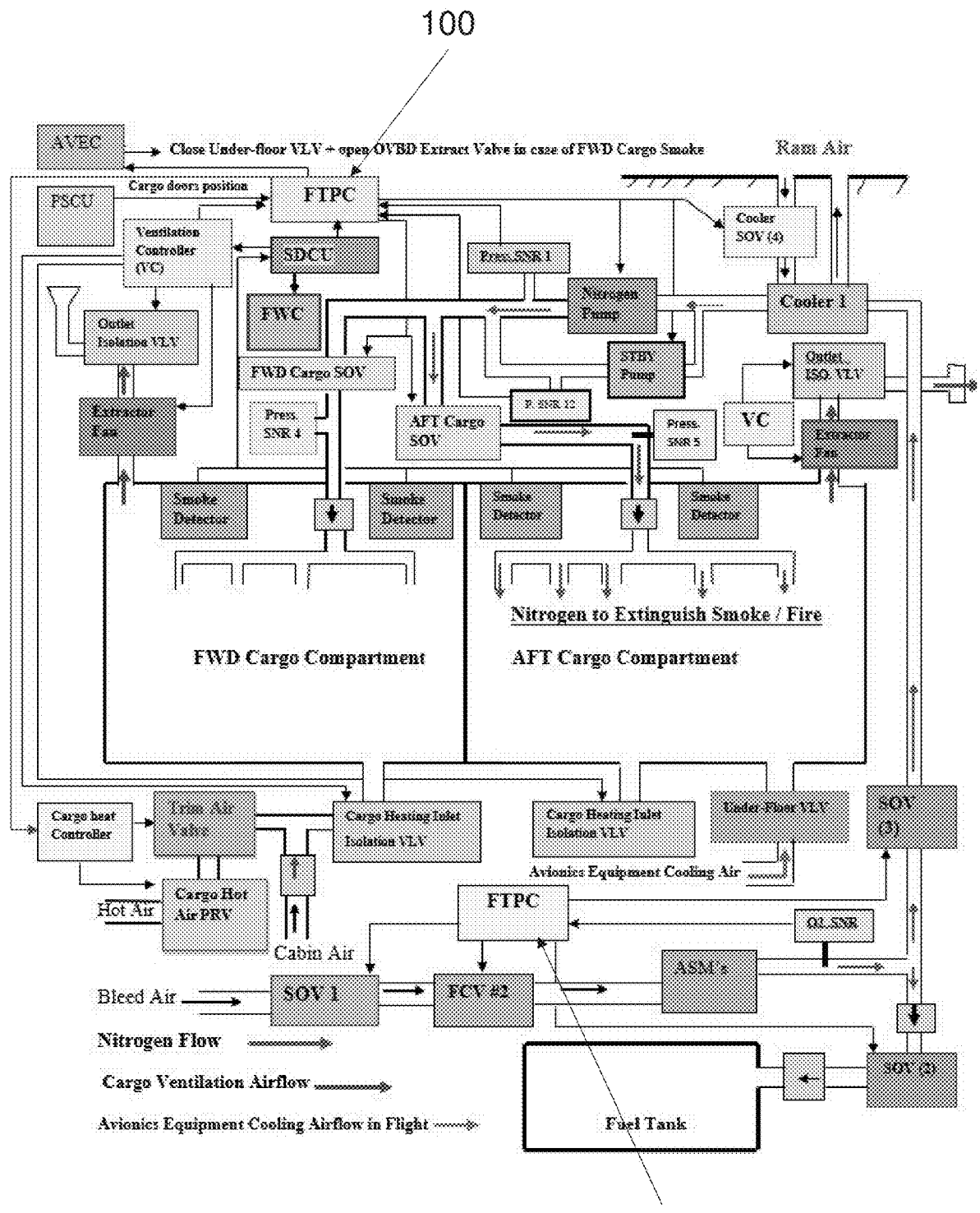
FIG. 14 may be a diagram showing an exemplary embodiment of a cargo compartment fire extinguishing system.

Still referring to FIG. 13 and FIG. 14, if smoke is detected in the forward cargo compartment, provided that the forward cargo compartment door is be closed, which may be sensed by PSCU, and provided the SDCU is serviceable, then the FTPC 100 may command the AVEC 802 to close the under floor valve and to open overboard extract valve. This may allow avionics equipment bay cooling air to be exhausted overboard and not into the forward cargo compartment. Further, the FTPC 100 may send a signal to the cargo compartment ventilation controller to close the outlet isolation valve (to stop the cargo compartment ventilation system). The FTPC 100 may command, the cargo compartment heating controller to stop cargo compartment heating (the cargo compartment heating inlet isolation valve may close). The FTPC 100 may command the following: the SOV 1 may open to let bleed air enter the ASM 110, the FCV may open more (high flow mode) to increase the bleed air supply to the ASM 110, thus providing a greater nitrogen output from the ASM 110. The SOV (3) may open to allow the nitrogen flow to reach the nitrogen pump. The nitrogen pump 608 may run to supply nitrogen under pressure, and at a fast rate, to the forward cargo compartment via the forward cargo compartment shut-off valve (SOV). The cooler SOV (4) may open and may allow the ram air to the cooler 1, to cool the nitrogen in order to increase its density by reducing its temperature. The nitrogen output from the ASM 110 may be regulated to 94 degrees Celsius for better operational performance of the ASM 110. When the nitrogen is cooled, it may reduce the temperature of the fire in the affected area.

In an exemplary embodiment illustrated in FIG. 13, if smoke is detected in the aft cargo compartment, the FTPC 100 may command the aft cargo compartment SOV to open and direct nitrogen to the aft cargo compartment. If the SDCU receives the smoke signal from the detectors, it may supply a warning signal to the FWC 602 in order to generate warning messages in the cockpit. The SDCU may send a signal to the ventilation controller (VC) to close a number of isolation valves of the cargo compartment ventilation system. The forward and aft cargo compartment ventilation system may be optional, however, in order to extinguish fire in the cargo compartments, the isolation valves may be closed to prevent oxygen flow to reach the affected compartment. In a further embodiment, if the numbers of valves are closed, then the nitrogen may flow to the applicable cargo compartment, in order to isolate the fire from oxygen supply. Further, the nitrogen may be used as a back up to assist the main fire extinguishing system onboard aircraft. The cargo compartment heat controller and ventilation controller may send data to the FTPC 100 about the status of the isolation valves during smoke condition and the FTPC 100 logics may supply nitrogen to the applicable compartment. If the smoke detectors sense smoke in the forward cargo compartment, the smoke detectors may send a warning signal to the SDCU which in turn may send a signal to the FWC 602 in order to generate an oral and visual warnings to the pilots. The SDCU may send signals to the ventilation controller to stop the ventilation in specific cargo compartment and volumes. The extract fan may stop and the number of outlet isolation valves may close. Further, the SDCU may send signals to the cargo compartment heat controller to close the inlet isolation valve and to the cargo compartment trim air valve to stop heating of the cargo compartment. When the applicable isolation valves are closed, the cargo compartment heating and ventilation controller may send data to the FTPC 100 and the data may be used as part of the logics. The FTPC 100 may send signals to the AVEC 802 to close the under floor valve, to stop the avionics equipment bay cooling air to be discharged in the forward cargo compartment, and to open the overboard extract valve. The FTPC 100 may supply nitrogen to the forward cargo compartment, in order to quickly extinguish the fire and or smoke. If the smoke detectors no longer detect smoke condition, the SDCU may send a no smoke condition signal and, the FTPC 100 may close the cargo SOV, the SOV (3), the cooler SOV (4) and stop the nitrogen pump. The FTPC 100 may command the AVEC 802 to re-open the under floor valve and to close the overboard extract valve. The FTPC may also send signals to the ventilation controller to re-open the number of isolation valves.

In an exemplary embodiment, some aircraft may have a cargo compartment heating system and a cargo compartment ventilation system for live animals transport. The cargo compartment heating system may be optional and it may be controlled manually by the pilot. For example, the cargo compartment heat controller may control a trim air valve and a cargo compartment hot air pressure regulating valve. The trim valve may be a stepper motor which may modulate the amount of hot air going to the cargo compartment according to the temperature selected by the pilot.

In an exemplary embodiment illustrated in FIG. 13 and FIG. 14, if there is smoke in the aft cargo compartment, then the FTPC 100 may command the cargo compartment heat controller to stop the heating system and the ventilation controller to stop the cargo compartment ventilation so as to stop the supply of oxygen to the fire and to allow the percentage of nitrogen in the volume to increase quickly and become more effective. The smoke condition may eventually disappear and the cargo compartment heating and ventilation may return to normal operation.

In another exemplary embodiment, the aircraft main wheel well may include a number of fuel operated valves, fuel pumps, hydraulic valves, and hydraulic reservoirs. There may be fire detectors in the main wheel well but may or may not be fire extinguishers. When fire detectors sense fire in the wheel well, a fire warning may be generated to the crew. As part of operational procedure, the pilot may lower the landing gears and land as soon as possible. Because the center fuel tank 120 may be located proximate the main wheel well, a fire in the wheel well may increase the fuel temperature until it may reach the auto-ignition point and may result in a center fuel tank 120 explosion or fire.

Figure 16:
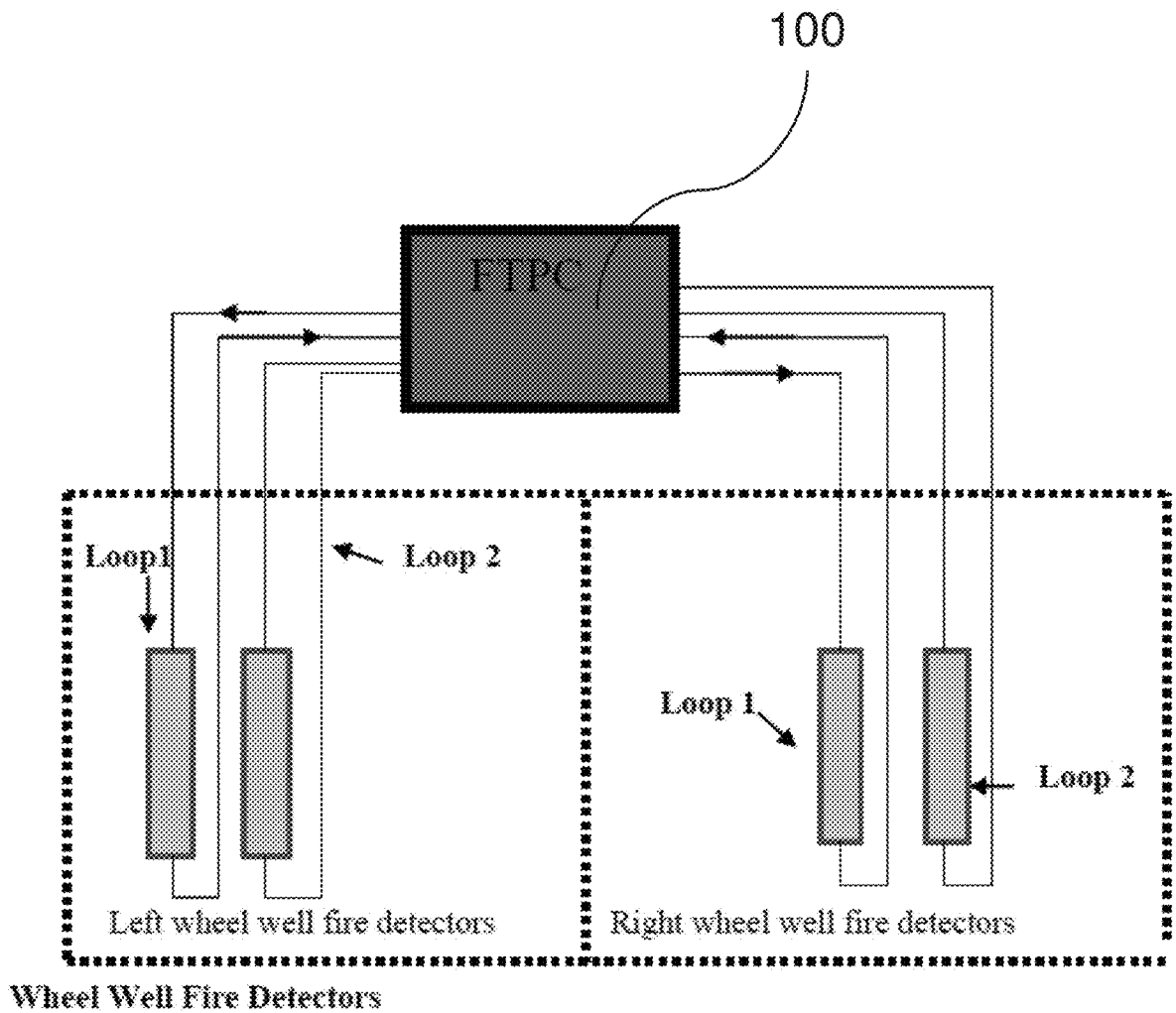
FIG. 16 may be a diagram showing an exemplary embodiment of wheel well fire detectors.
Figure 17:
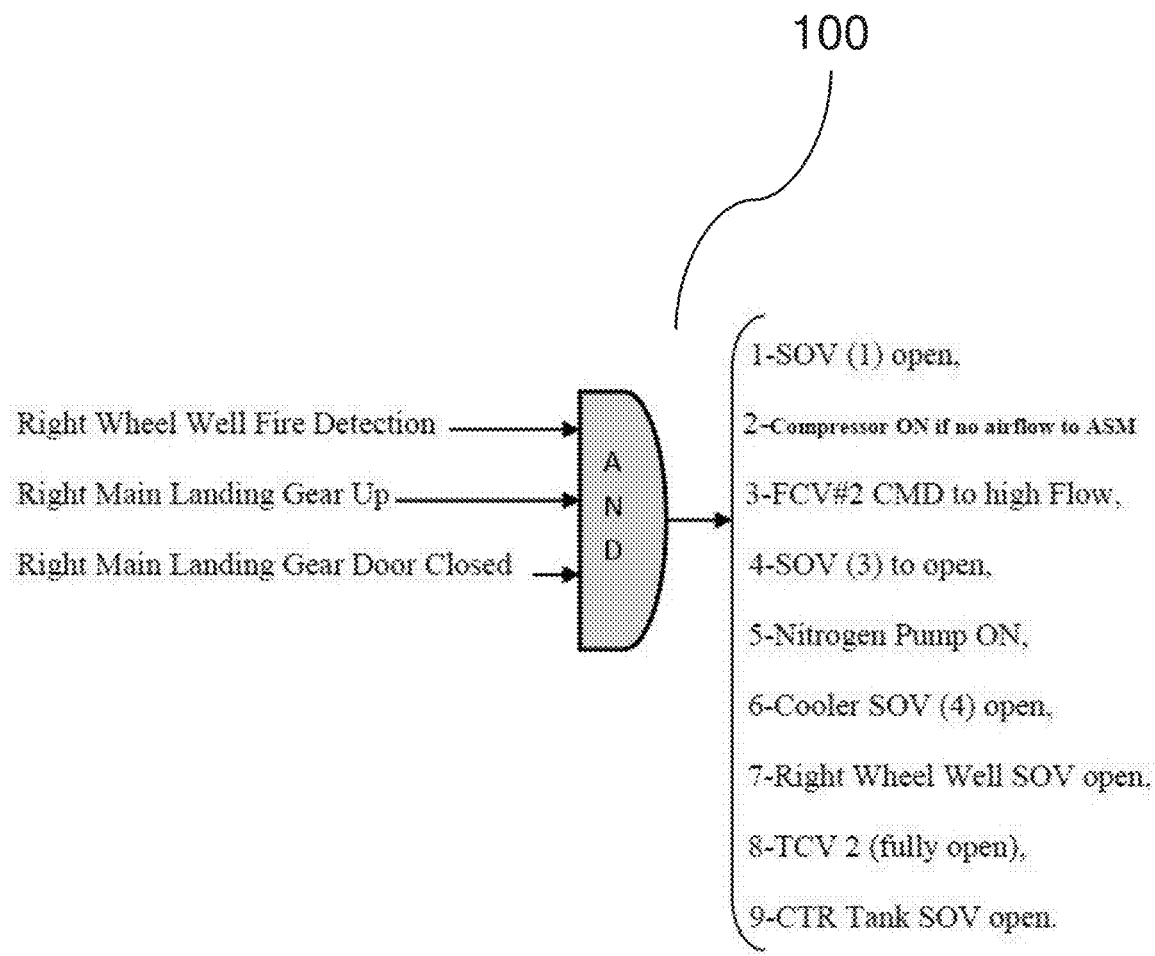
FIG. 17 may be a diagram showing an exemplary embodiment of the FTPC logics for main wheel well fire protection to prevent center fuel tank explosion.

In an exemplary embodiment illustrated in FIG. 15, FIG. 16, and FIG. 17, heat sensing elements may be installed in the wheel well compartment, and when there may be an overheat or fire condition, and if the main landing gears is up and the doors closed, the nitrogen generated from the ASM 110 may be routed to the wheel well to assist in extinguishing the fire. If there is a tire fire on the left main wheel well, when the main landing gear is up and its associated door may be closed, the left main wheel well fire detectors may sense the fire and the FTPC 100 may supply nitrogen to the left main wheel well to extinguish the fire and to prevent fuel vapors to ignite and lead to a fuel tank 120 explosion. At the same time, the FTPC 100 may increase the fuel tank 120 cooling to minimize a raise in fuel temperature (due to heat transfer). The FTPC 100 may command the TCV 3 to open more, allowing more cold air to pass through the heat exchanger (cooler 3), thus cooling the nitrogen flow into the fuel tank 120. Further, the FTPC 100 may command the SOV (1) to open in order to allow the bleed air from the engine or the air compressor to be supplied to the ASM 110. The air compressor may operate if there is no bleed air or an insufficient airflow to the ASM 110. The FCV 2 may open further, as a high flow mode may be selected, in order to increase the airflow to the ASM 110. The SOV (3) may open to let the nitrogen generated from the ASM 110 to be routed to the nitrogen (N2) pump. Then, the nitrogen pump 608 may increase the pressure of the nitrogen flow and the cooler SOV (4) may open to allow the cold ram air to cool the nitrogen from the ASM 110. At that time, the left wheel well SOV may open to let the nitrogen extinguish the fire in the left wheel well area. The TCV 3 may fully open to intensify the cooling of the nitrogen flow via the heat exchanger cooler 3 to the center fuel tank 120 and the fuel tank SOV may open to pressurize the center fuel tank 120 with an inert gas such as nitrogen to reduce the risk of a fuel tank 120 explosion, provided a safe differential pressure may be not exceeded.

In an exemplary embodiment illustrated in FIG. 15, the LGCIU may provide information to the FTPC 100 about landing gears status (up or down) and the landing gears door conditions. If the landing gears are up and their associated door are closed, and if there is a tire fire or a fire in the wheel well area, the FTPC 100 logics may supply nitrogen to extinguish the fire. Now referring to FIG. 17, in order to ensure that nitrogen may effectively extinguish the fire in wheel well area, then the landing gears maybe up and the corresponding door may be closed, providing a sealed compartment for the nitrogen to effectively extinguish the fire.

In an exemplary embodiment illustrated in FIG. 15, If the FTPC 100 commands the right main wheel well SOV to open during fire, but if the valve fails to open or if the valve is open but no nitrogen pressure may be detected (for example, due to a leak), then the pressure sensor 12 may send a signal to the FTPC 100 to generate a failure warning prompting maintenance personnel to take corrective action.

In another exemplary embodiment illustrated in FIG. 17, the logics for the main wheel well fire protection to prevent center fuel tank 120 explosion may be provided. The pressure Sensor 20 may be used to sense the nitrogen flow pressure and a stopped or very low nitrogen flow may indicate a failure of the left main wheel well SOV or a nitrogen flow leakage in the pipe line. The left main landing gear may be retracted to the left main wheel well and the right main landing gear may be retracted to right main wheel well. If the left or right main gear tire is on fire, then the left or right wheel well fire detectors may sense it. The fire detector may include a thermistor type detector that may include a nickel center conductor and an outer sheath that may be filled with aeutectic salt. During an overheat condition, the resistance of the eutectic salt may drops sharply, thereby causing the controlled current to increase and may trigger the release of a signal the FTPC 100. It may be appreciated that any desired thermistor may be included, as may be understood by a person having ordinary skill in the art.

Figure 12:
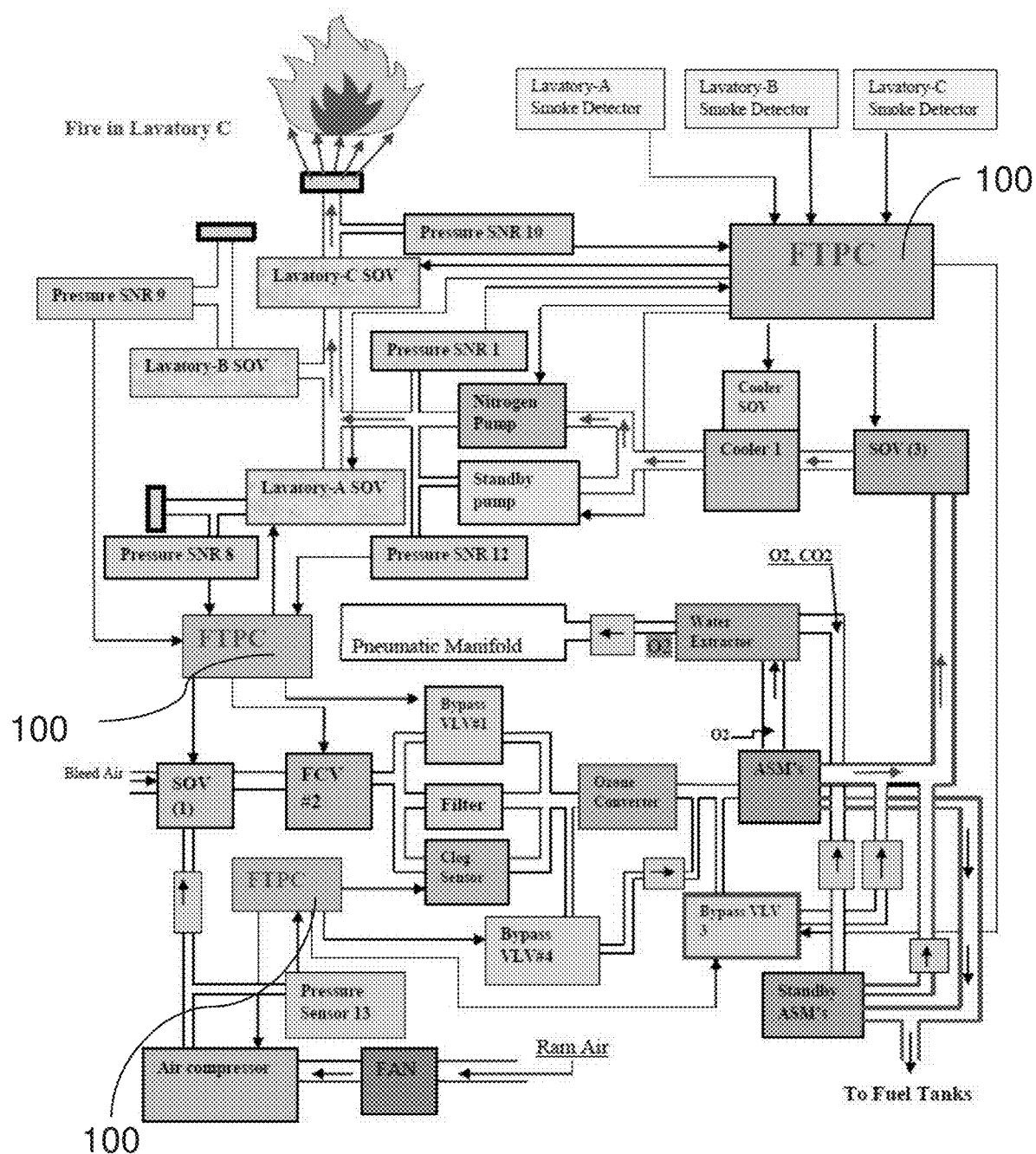
FIG. 12 may be a diagram showing an exemplary embodiment of a lavatory fire extinguishing system.

In an exemplary embodiment illustrated in FIG. 12, a fuel leak detection and avoidance system may include a collector enclosing the fuel tank 120. The collector may be designed to protect the main fuel tank 120 from any damage. The main fuel tank may be a container such as, but not limited to a synthetic rubber bag attached by cords to a rigid a metal container. It may be appreciated that any desired container and any desired means for securing the container in the collector may be combined as may be understood by a person having ordinary skill in the art. The collector may be used to collect any fuel leakage and may feed the leaked fuel to a reservoir through a dedicated flow meter and piping system. Further, the collector may be pressurized with nitrogen to act as a positive head pressure to move the leaked fuel quickly to the reservoir. The leaked fuel may pass through a flow-meter that may measure the fuel flow and may provide data to the FTPC 100.

Figure 18:
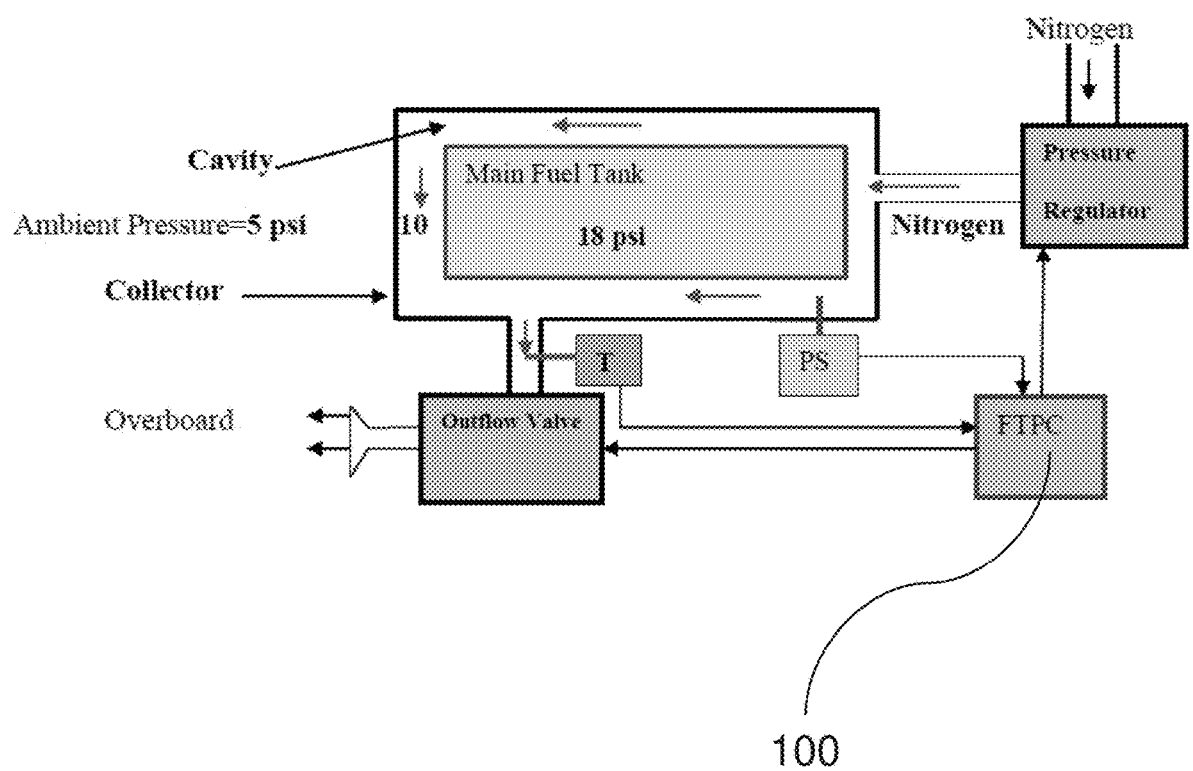
FIG. 18 may be a diagram showing an exemplary embodiment of the pressure control of nitrogen supplied to the fuel tank cavity.

In an exemplary embodiment illustrated in FIG. 18, the pressure of nitrogen supplied to the fuel leak collector may be controlled provided that the fuel tank 120 may be pressurized with nitrogen. For example, if the fuel tank 120 is pressurized, then the pressure inside the fuel tank 120 may exceed the maximum differential pressure with respect to the ambient atmospheric pressure. If the maximum allowable differential pressure is approximately 8 psi, and if the ambient pressure is approximately 5 psi, the pressure inside the tank may not exceed approximately 13 psi. However, by increasing the pressure of nitrogen going to the collector 2002 to approximately 10 psi, then the pressure inside the fuel tank 120 may be increased up to approximately 18 psi.

Figure 19:
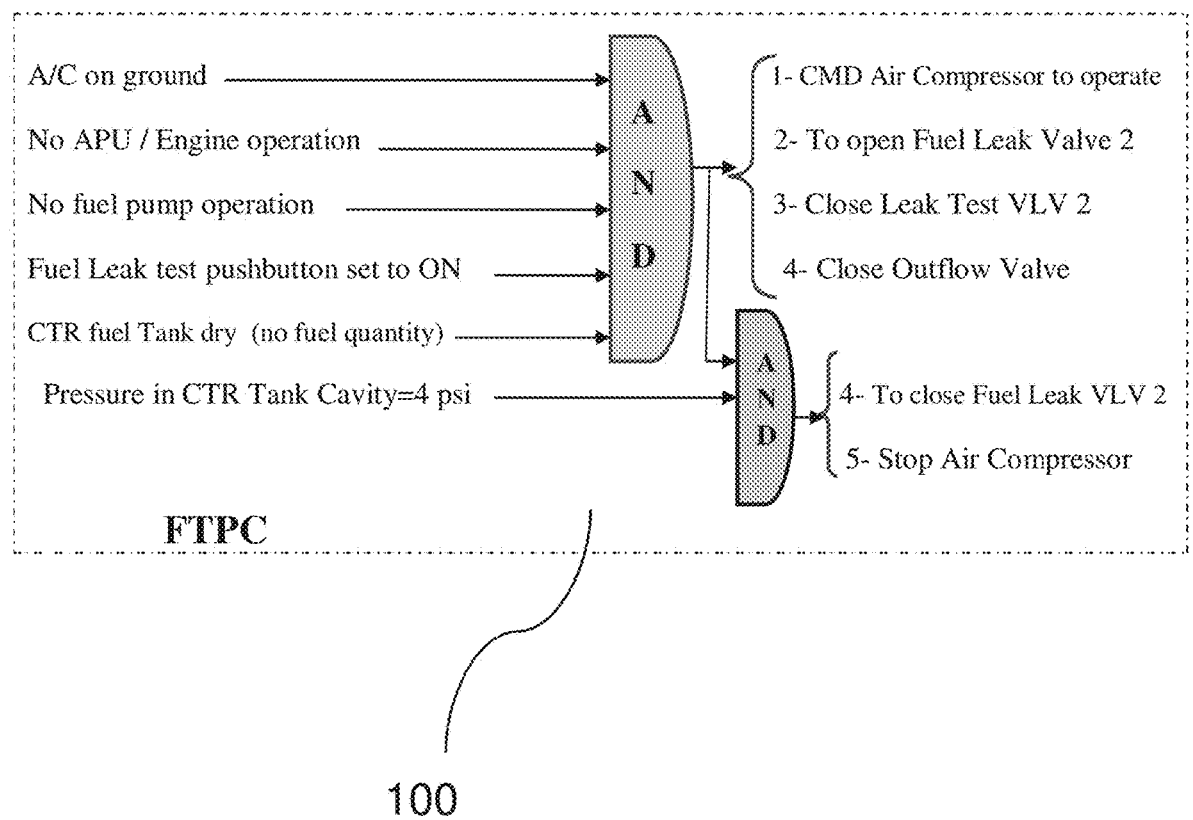
FIG. 19 may be a diagram showing an exemplary embodiment of the FTPC logics for center fuel tank leak test.

In an exemplary embodiment, the closed-loop fuel detection system may detect a fuel leak from a specific fuel tank, prompting the engineers to perform a fuel leak test to identify the exact location of fuel leakage on the specific fuel tank. For example, if the center fuel tank 120 is flagged as leaking fuel, then the fuel leak test may be performed. In order to perform fuel leak test, certain conditions must be fulfilled, as shown in FIG. 19. The logic conditions may be as follows: The center tank may be defueled and purged (free from fuel vapors) when the aircraft is on the ground. When no APU or engine or fuel pump are in operation, and the fuel leak test pushbutton is switched on, then the FTPC 100 may command the center fuel tank vent valve and the outflow valve to close (to isolate the tank from ambient atmosphere), and the FTPC 100 may command the fuel leak valve 2 to open. The air compressor may start to supply bleed air to the ASM 110 to generate nitrogen to pressurize the fuel tank cavity. When the nitrogen pressure reaches approximately 4 psi, then the FTPC 100 may command the fuel leak valve 2 to close. Maintenance personnel may obtain a soapy water solution, or any desired material, as recommended by the aircraft manufacturer, and may apply it on potentially leaking areas such as joints, fasteners, and sealants from inside of the fuel tank. Bubbles may indicate the source of the fuel leak. Once a leak may be detected, the personnel may perform necessary repairs. If the fuel leak is on the pipe line or on the collector 2002 (container which enclose the main fuel tank), then the soapy water solution may be applied to the outside surfaces, and if bubbles are present, it may indicate a fuel leak due to corrosion, crack, or damaged structure. The fuel leak may be due to a structure crack, a deteriorated fuel tank sealant or an incorrectly installed component.

Figure 20:
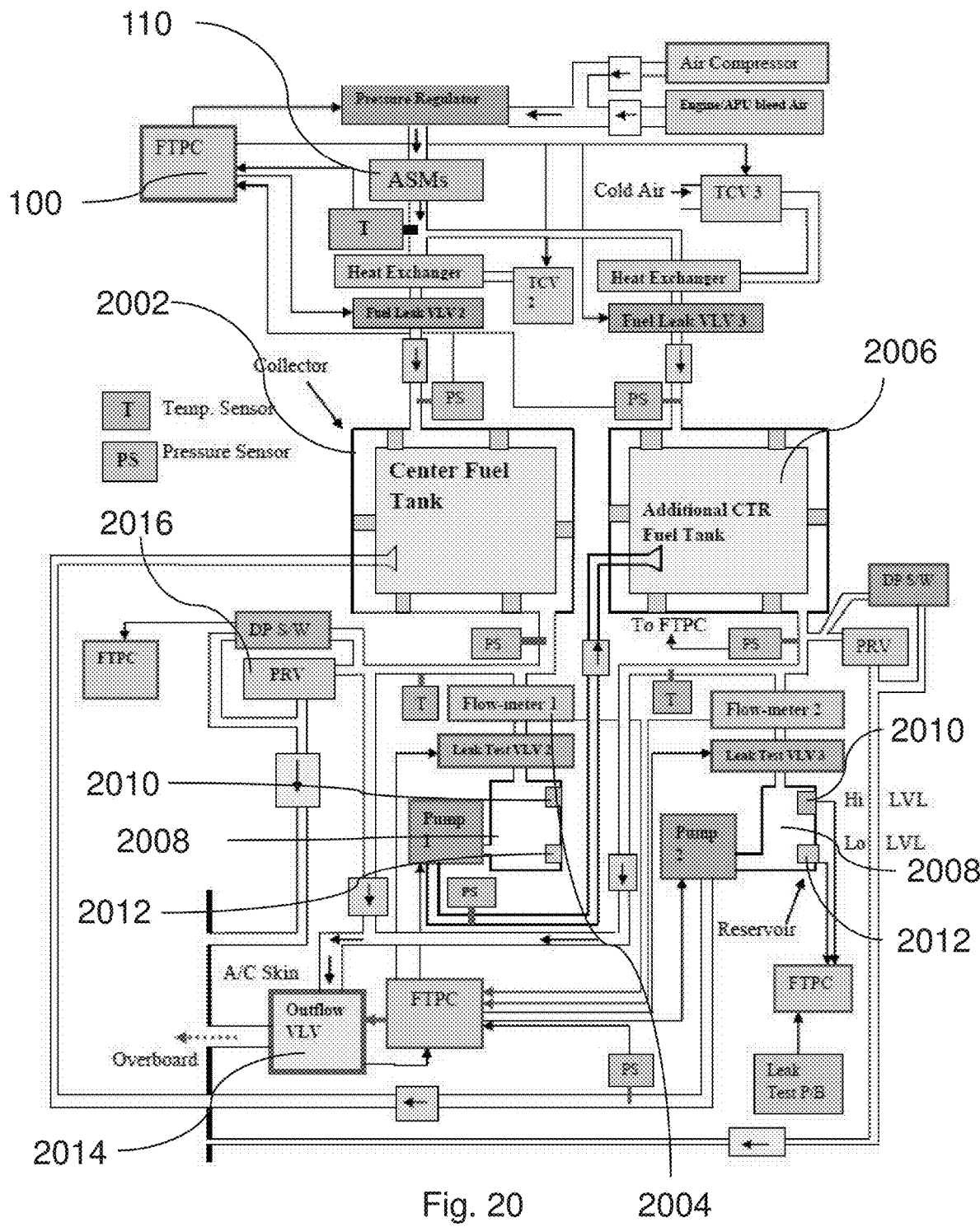
FIG. 20 may be a diagram showing an exemplary embodiment of a fuel leak detection and avoidance system.

Now referring to in FIG. 20, In case of fuel tank leakage, the reservoir high level sensor 2010 may send signals to the FTPC 100 to operate the fuel pump and return the fuel via a filter to a second fuel tank 2006 to prevent the fuel to be returned to the leaking fuel tank 120. If the fuel level decreases inside the reservoir to a lower level, the low level sensor 2012 may send a signal to the FTPC 100 to stop the pump. For safety, in case the pump fails to operate, the pump pressure sensor may senses that there may be no output pressure from the pump and may send signals to the FTPC 100 that may generate a warning alarm to take corrective action. The flow-meter 2004 may determine the amount of fuel leakage, and may indicate to the FTPC 100 that the system may have detected a fuel leak. Further, the fuel flow meter may be used to categorize the type of fuel leak as: light, heavy and continuous leakage so that maintenance personnel may take the appropriate action.

In an exemplary embodiment, there may be one flow meter for each fuel tank, so that fuel rate may be measured at different tank. The flow meter may send signals to the FTPC 100. In turn, the FTPC 100 may send signals to the FWC 602 to generate appropriate warning message in the cockpit describing the severity of the leak as light, heavy or continuous fuel leakage.

In an exemplary embodiment, in case of a fuel pump failure, the leaking fuel may continue to enter the reservoir, until the high level sensor in the reservoir may detect a high level of fuel, then the FTPC 100 may command the outflow valve 2014 to open, and any excessive fuel leak under nitrogen pressure may be routed to the outflow valve and released overboard at a safe location, away from a hot engine, equipment systems, or any fire sources. The outflow valve 2014 may be located at the aft section of the fuselage. In case of an outflow valve failure (for example, the valve may be stuck in a closed position permanently) or in case of over pressurization of the fuel tank 120 cavities, then the pressure relief valve (PRV) 2016 may open, and release the excessive pressure or fuel overboard. The PRV 2016 may be a purely mechanical device, and may operate according to the differential pressure. If the PRV 2016 is permanently stuck in the open position, the differential pressure switch may not sense a difference in the pressure between the inlet and the outlet of the PRV 2016, thus the differential pressure switch may generate a signal to the FTPC 100, and the FTPC 100 may, in turn, generate a warning message for maintenance personnel to take corrective action. If the PRV 2016 is caught in the open position, a non-return valve in the pipe line may prevent the outside ambient air pressure to enter the fuel tank 120 cavity.

Figure 21:
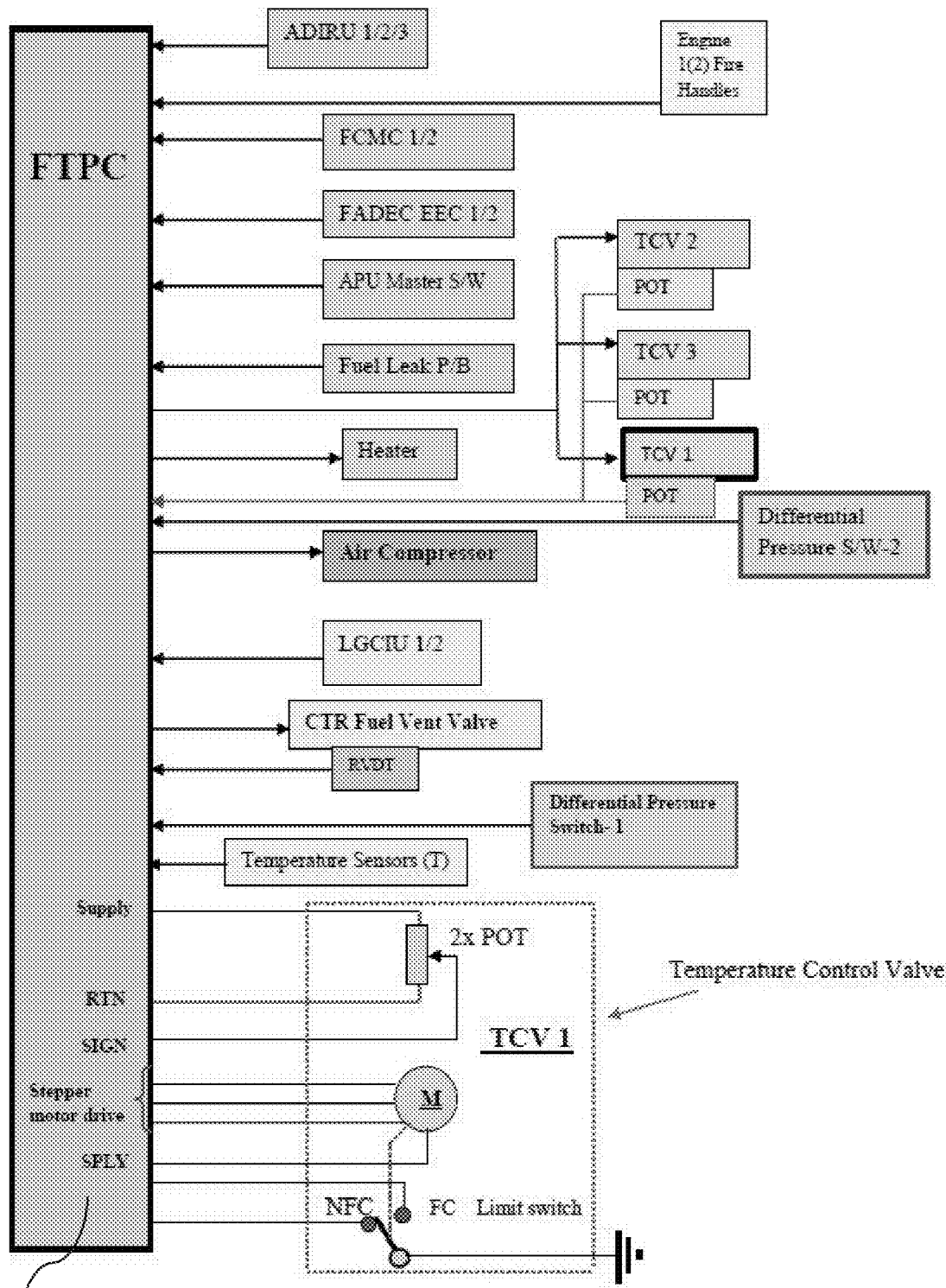
FIG. 21 may be a diagram showing an exemplary embodiment of inputs and outputs for fuel leak detection and avoidance system.
Figure 22:
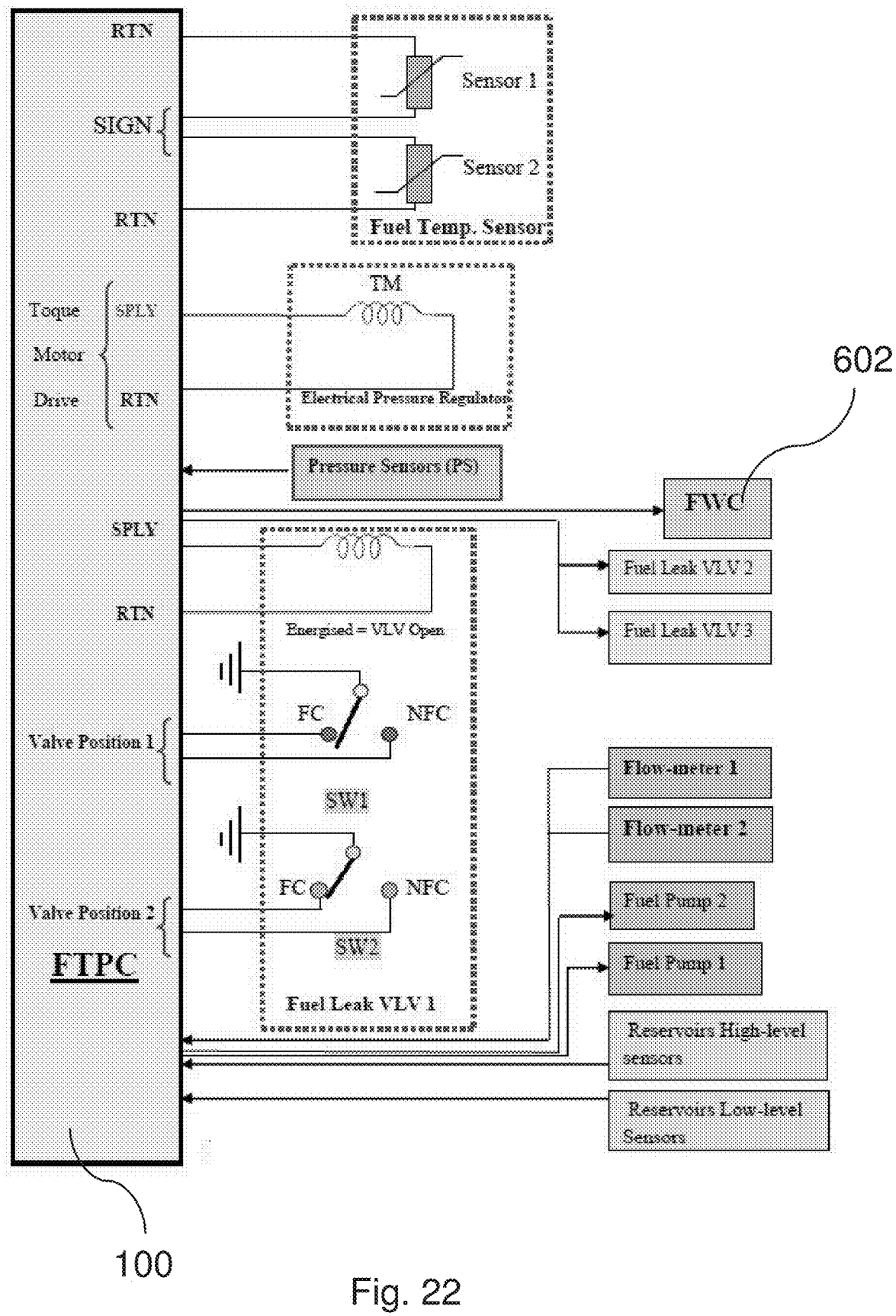
FIG. 22 may be a diagram showing an exemplary embodiment of inputs and outputs for fuel leak detection and avoidance system.

In an exemplary embodiment illustrated in FIG. 21 and FIG. 22, inputs and outputs from the FTPC 100, may be used by the leak detection and avoidance system. The fuel leak detection and avoidance system may be installed with a number of safety features that may safeguard the system in the event of a failure. The system may detect fuel leaks at any time during flight, and may inform the pilot about which tank may be leaking fuel, so timely corrective action may be taken.

In a further exemplary embodiment, the nitrogen pressure and temperature may be controlled to serve several functions. The nitrogen pressure and temperature may be employed to prevent fuel icing at higher altitude, by heating up the main fuel tank 120. Or to heat up the upper surface of the wing, in order to prevent accumulation of frost or ice on the wing, effectively acting as de-icing and anti-icing agent. Further, the pressure of nitrogen going to the fuel tank cavity may be controlled, to allow the main fuel tank 120 to be pressurized to higher pressures to control the increase of the differential pressure between the inside and the outside of the fuel tank.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. An inerting and pressurization system for an aircraft fuel tank comprising:
   an inert gas supply network;
   at least one fuel tank flow control valve connecting the fuel tank to the inert gas supply network, the fuel tank flow control valve operated by two torque motors, wherein the first torque motor is active while the second torque motor is in standby in case the first motor fails, wherein the torque motors may modulate the degree to which the fuel tank flow control valve is open in order to change the flowrate therethrough;
   a dual rotary variable differential transformer (RVDT) configured to sense the position of the torque motor;
   a plurality of air separator modules adapted to connect with the inert gas supply network, wherein the flow control valve controls an amount of bleed air supply to the air separator modules in order to adjust an inert gas supply output from the air separator modules to the fuel tanks, wherein the inert gas supply output increases when the bleed air supply input increases;
   a programmable controller adapted to automatically operate the plurality of air separator modules and the at least one fuel tank valve in order to increase the proportion of an inert gas in the inert gas supply network, the programmable controller is adapted to monitor at least one pressure sensor to determine the pressure of gas inside of the fuel tank and to operate at least one fuel tank valve connected with the inert gas supply network when the pressure in that fuel tank is below a predetermined pressure, wherein the at least one pressure sensor comprises a pressure sensor that monitors the pressure in the fuel tank and a supply pressure sensor that monitors the pressure in the inert gas supply network; and
   at least one automatic venting valve operable by the programmable controller to connect or disconnect the fuel tank with the atmosphere, and wherein the programmable controller monitors at least one atmospheric pressure sensor to determine a differential pressure between the fuel tank and an atmospheric pressure, wherein the programmable controller opens the automatic venting valve when the differential pressure between the fuel tank and the atmospheric pressure reaches a predetermined threshold;
   wherein oxygen supply to the fuel tank is stopped and nitrogen supply under pressure is provided to the fuel tank when there is a fire warning or smoke warning, to extinguish the fire or smoke;
   a shutoff valve connected to the fuel tank and the inert gas supply network controlled by the programmable controller;
   a safety valve which operates mechanically and is opened by the pressure of gas in the fuel tank when the differential pressure between the fuel tank and the atmospheric pressure reaches a predetermined threshold, wherein the safety valve opens in an inward direction if the differential pressure is positive and opens in an outward direction if the differential pressure is negative;
      a proximity sensor located on the safety valve configured to communicate a position of the safety valve to the programmable controller; and
      an over-pressurization protector comprising a plastic disc configured to break when the fuel tank reaches a maximum differential pressure.

2. The inerting and pressurization system of claim 1, wherein the at least one fuel tank valve includes a gas pressure regulator to regulate the pressure of gas supplied by the inert gas supply network to the fuel tank.

3. The inerting and pressurization system of claim 1, wherein the at least one fuel tank valve includes an automatic valve that is operable by the programmable controller to connect or disconnect a tank with the inert gas supply network.

4. The inerting and pressurization system of claim 1, wherein the fuel tank is contained in a reservoir, wherein the reservoir collects fuel leaking from the fuel tank.

5. The inerting and pressurization system of claim 1, wherein the programmable controller is responsive to the at least one pressure sensor to operate an automatic filling valve and an automatic venting valve.

6. The inerting and pressurization system of claim 1, wherein the programmable controller is responsive to the supply pressure sensor to operate the at least one fuel tank valve.

* * * * *